United States Patent
Kawamura et al.

(10) Patent No.: US 7,200,366 B2
(45) Date of Patent: *Apr. 3, 2007

(54) DATA COMMUNICATION APPARATUS AND METHOD

(75) Inventors: Takuya Kawamura, Hyogo-ken (JP); Yosuke Tajika, Hyogo-ken (JP)

(73) Assignee: Kabushiki Kaisha Toshiba, Kawasaki-shi (JP)

(*) Notice: Subject to any disclaimer, the term of this patent is extended or adjusted under 35 U.S.C. 154(b) by 455 days.

This patent is subject to a terminal disclaimer.

(21) Appl. No.: 10/640,006

(22) Filed: Aug. 14, 2003

(65) Prior Publication Data

US 2004/0097199 A1 May 20, 2004

Related U.S. Application Data

(62) Division of application No. 09/506,378, filed on Feb. 18, 2000, now Pat. No. 6,693,879.

(51) Int. Cl.
*H04B 1/02* (2006.01)
*H04B 7/00* (2006.01)
*H04Q 7/20* (2006.01)

(52) U.S. Cl. ............... 455/91; 455/422; 455/426.1; 455/445; 370/235; 370/315; 370/475; 709/200

(58) Field of Classification Search ............ 455/91, 455/561, 422, 560, 522.1, 426.1, 453, 454, 455/458, 466, 557.1, 556, 445; 370/235, 370/315, 475

See application file for complete search history.

(56) References Cited

U.S. PATENT DOCUMENTS 5,099,346 A    3/1992   Lee et al.

(Continued)

FOREIGN PATENT DOCUMENTS

JP          10-173653          6/1990

OTHER PUBLICATIONS

Gfeller et al., "Wireless Infrared Transmission: How to Reach all Office Space," 1996 IEEE, 46th Vehicular Technology Conference (Apr. 28-May 1, 1996), 3:1535-39.

*Primary Examiner*—Tony T. Nguyen
(74) *Attorney, Agent, or Firm*—Finnegan, Henderson, Farabow, Garrett & Dunner, L.L.P.

(57) ABSTRACT

A data communication apparatus as a device. A discrimination data of own device is sent. When the discrimination data is received from another device, the discrimination data is stored as a direct communicatable device for the own device. A direct communicatable device list including the stored discrimination data is generated and sent with the discrimination data of the own device. When the direct communicatable device list is received from other device, the direct communicatable device list is stored as an indirect communicatable device for the own device. In response to selection of the discrimination data as a destination address from the discrimination data of the direct communicatable device and the indirect communicatable device, data with the destination address is sent. When the data is received from other device, the destination address of the received data is decided to coincide with the discrimination data of the own device or the direct communicatable device. If the destination address coincides with the discrimination data of the direct communicatable device, the received data is relayed to the direct communicatable device of the destination address.

20 Claims, 14 Drawing Sheets

U.S. PATENT DOCUMENTS

| | | |
|---|---|---|
| 5,247,380 A | 9/1993 | Lee et al. |
| 5,786,923 A | 7/1998 | Doucet et al. |
| 5,861,969 A | 1/1999 | Yasuda |
| 6,128,512 A * | 10/2000 | Trompower et al. ........ 455/561 |
| 6,335,812 B1 | 1/2002 | Matsubara et al. |
| 6,766,168 B1 * | 7/2004 | Lim ........................ 455/435.1 |
| 6,826,405 B2 * | 11/2004 | Doviak et al. .............. 455/445 |

* cited by examiner

FIG. 7
| CONNECTION IDENTIFIER | QUALITY | ADDRESS | ADDRESS LIST |
|---|---|---|---|
| t11 | t21 | t31 | t41 |
| t12 | t22 | t32 | t42 |
| t13 | t23 | t33 | t43 |
| t14 | t24 | t34 | t44 |
| t1n | t2n | t3n | t4n |
FIG. 8
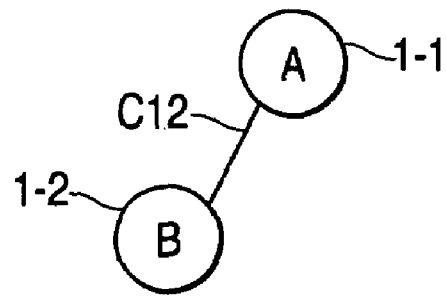
FIG. 9
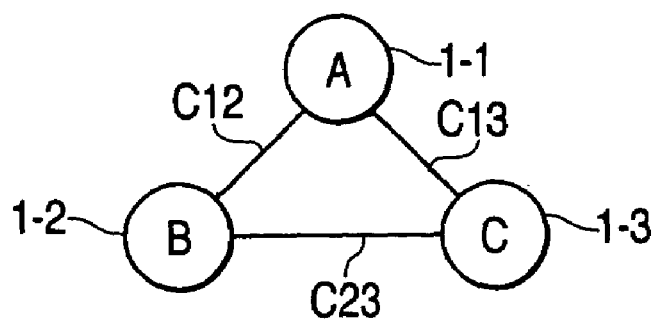

FIG. 10

| CONNECTION IDENTIFIER | QUALITY | ADDRESS | ADDRESS LIST |
|---|---|---|---|
| C12 | 1Mbps | B | A,C |
| C13 | 2Mbps | C | A,B |
| t13 | t23 | t33 | t43 |
| t14 | t24 | t34 | t44 |
| t1n | t2n | t3n | t4n |

FIG. 11

| CONNECTION IDENTIFIER | QUALITY | ADDRESS | ADDRESS LIST |
|---|---|---|---|
| C12 | 1Mbps | B | A,C,D |
| C13 | 2Mbps | C | A,B,D |
| t13 | t23 | t33 | t43 |
| t14 | t24 | t34 | t44 |
| t1n | t2n | t3n | t4n |

FIG. 12

| CONNECTION IDENTIFIER | QUALITY | ADDRESS | ADDRESS LIST |
|---|---|---|---|
| C12 | 2Mbps | A | B,C |
| C13 | 1Mbps | B | A,C,D |
| C34 | 4Mbps | D | B,C |
| t14 | t24 | t34 | t44 |
| t1n | t2n | t3n | t4n |

FIG. 16
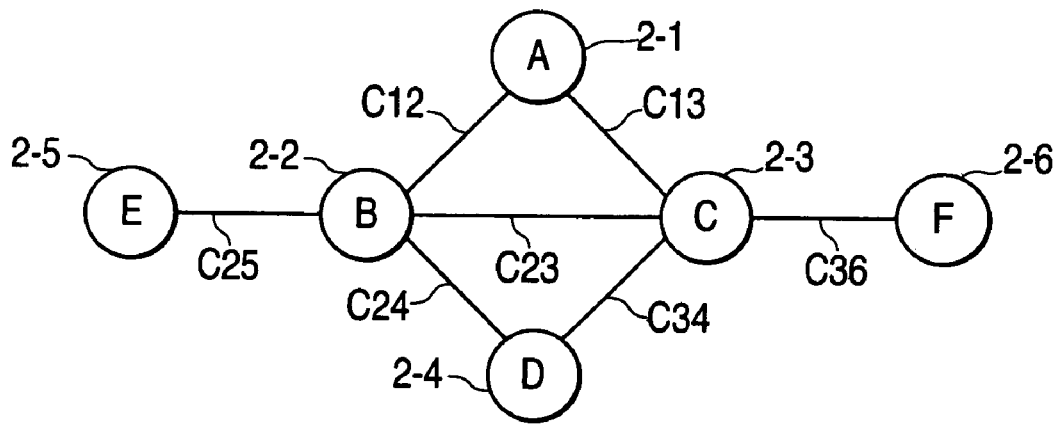
FIG. 17
| CONNECTION IDENTIFIER | QUALITY | ADDRESS | ADDRESS LIST |
|---|---|---|---|
| C12 | 1Mbps | B | A,C,D,E |
| C13 | 2Mbps | C | A,B,D,F |
| t13 | t23 | t33 | t43 |
| t14 | t24 | t34 | t44 |
| t1n | t2n | t3n | t4n |
FIG. 18
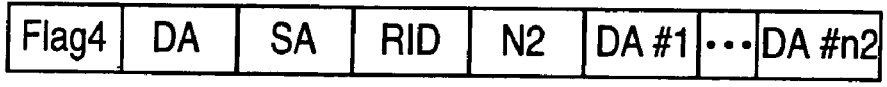
| Flag4 | DA | SA | RID | N2 | DA #1 | ... | DA #n2 |
FIG. 19
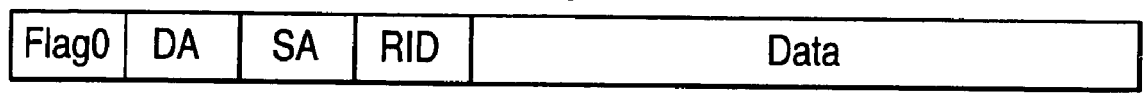
| Flag0 | DA | SA | RID | Data |

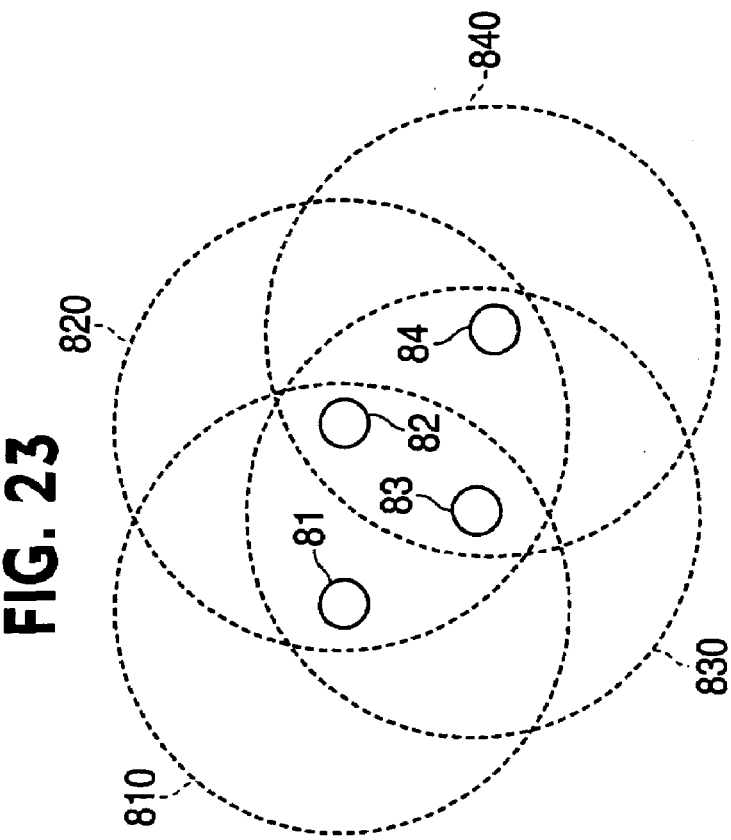

FIG. 25

| DEVICE ADDRESS | QUALITY | ADDRESS | ADDRESS LIST |
|---|---|---|---|
| t11 | t21 | t31 | t41 |
| t12 | t22 | t32 | t42 |
| t13 | t23 | t33 | t43 |
| t14 | t24 | t34 | t44 |
| t1n | t2n | t3n | t4n |

FIG. 26

| QUALITY | ADDRESS | ADDRESS LIST |
|---|---|---|
| t21 | t31 | t41 |
| t22 | t32 | t42 |
| t23 | t33 | t43 |
| t24 | t34 | t44 |
| t2n | t3n | t4n |

FIG. 27

| DEVICE ADDRESS | QUALITY | ADDRESS | ADDRESS LIST |
|---|---|---|---|
| DA82 | CONNECTION | A82 | A81, A83, A84 |
| DA83 | CONNECTION | A83 | A81, A82, A84 |
| t13 | t23 | t33 | t43 |
| t14 | t24 | t34 | t44 |
| t1n | t2n | t3n | t4n |

| DEVICE ADDRESS | QUALITY | ADDRESS | ADDRESS LIST |
|---|---|---|---|
| DA82 | CONNECTION | A82 | A81, A83, A84 |
| DA83 | DISCONNECTION | t32 | t42 |
| t13 | t23 | t33 | t43 |
| t14 | t24 | t34 | t44 |
| t1n | t2n | t3n | t4n |

| DEVICE ADDRESS | QUALITY | ADDRESS | ADDRESS LIST |
|---|---|---|---|
| DA82 | CONNECTION | A82 | A81, A83, A84 |
| DA83 | CONNECTION | A83 | A81, A82 |
| t13 | t23 | t33 | t43 |
| t14 | t24 | t34 | t44 |
| t1n | t2n | t3n | t4n |

DATA COMMUNICATION APPARATUS AND METHOD

This is a division of Application No. 09/506,378, now U.S. Pat. No. 6,693,879 filed Feb. 18, 2000, which is incorporated herein by reference.

FIELD OF THE INVENTION

The present invention relates to a data communication apparatus and a method to mutually communicate data among a plurality of devices by using a directional signal as a carrier wave

BACKGROUND OF THE INVENTION

Data communication systems using an infrared ray are classified as follows.

Type 1: A transmission apparatus of directivity radiates an infrared ray of narrow beam width, and a receiving apparatus of narrow view angle directly receives the infrared ray.

Type 2: The transmission apparatus of directivity or a transmission apparatus of indirectivity radiates an infrared ray of wide beam width, and a receiving apparatus of wide view angle directly receives the infrared ray.

Type 3: The transmission apparatus of directivity radiates an infrared ray of narrow beam width, and a receiving apparatus of wide view angle directly receives the infrared ray.

Type 4: The transmission apparatus of directivity or the transmission apparatus of indirectivity radiates an infrared ray of wide beam width, and the receiving apparatus of narrow view angle directly receives the infrared ray.

Type 5: The transmission apparatus of directivity radiates an infrared ray of narrow beam width, and the receiving apparatus of narrow view angle receives the infrared ray reflected by the ceiling or the wall of the room.

Type 6: The transmission apparatus of directivity or the transmission apparatus of indirectivity radiates an infrared ray of wide beam width, and the receiving apparatus of wide view angle receives the infrared ray reflected by the ceiling or the wall of the room.

Type 7: The transmission apparatus of directivity radiates an infrared ray of narrow beam width, and the receiving apparatus of wide view angle receives the infrared ray reflected by the ceiling or the wall of the room.

Type 8: The transmission apparatus of directivity or the transmission apparatus of indirectivity radiates an infrared ray of wide beam width, and the receiving apparatus of narrow view angle receives the infrared ray reflected by the ceiling or the wall of the room.

The types 1, 2, 3, 4 are called line of sight (LOS) link type communication system because a receiving side directly receives the infrared ray radiated by a sending side. The types 5, 6, 7, 8 are called a non-line of sight (LOS) link type communication system because the receiving side does not directly receive the infrared ray radiated by the sending side. As a condition of the view type communication system, the transmission side and the receiving side exist in a view area line of sight. If an obstacle object exists between the transmission side and the receiving side, the communication is not executed. On the other hand, the non-view type communication system uses a diffusion light reflected by the ceiling or the wall. Therefore, even if the transmission side and the receiving side are not located in the view area, the communication is executed. Especially, the type 6 is called an infrared ray communication system of diffusion type, whose free degree of communicatable device location is largest among the above eight types.

However, in the infrared ray communication system, it is not always assured that a particular device (own terminal) can communicate to all other devices surroundingly existed. In short, a hidden terminal to which the direct light and the reflected light do not reach often exists. For example, naturally, the particular device can not communicate to other devices spaced more than the maximum communicatable distance away. It is possible that a neighboring device becomes the hidden terminal because the infrared ray is not transmitted by the obstacle object. Furthermore, in case a plurality of devices are located to mutually communicate, all devices must be located in a common area in which communicatable areas of the all devices overlap. If at least one device is not located in the common area, mutual communication is not executed.

FIGS. 1A and 1B show an example of mutual communicatable area for a plurality of devices. In FIGS. 1A and 1B, a communicatable area of the infrared ray communicatable device 91 is 910, a communicatable area of the infrared ray communicatable device 92 is 920, a communicatable area of the infrared ray communicatable device 93 is 930. In order for the devices 91, 92, 93 to mutually communicate, the communicatable areas of the devices 91, 92, 93 must overlap. As a result, a mutual communicatable area is limited. In addition to this, if another device 94 appears, the other device 94 must be located so that all communicatable areas of the devices are overlapped. If the device 94 is located as the communicatable area 940 shown in FIGS. 1A and 1B, mutual communication of four devices 91, 92, 93, 94 is impossible.

In FIGS. 1A and 1B, the communicatable area of each device is represented as a circle or a rectangle. However, actually, the communicatable area is transformed by direction of the sending apparatus and effect of the obstacle object. In proportion to increase of a number of devices, the mutual communicatable area is further limited.

As a method to extend the mutual communicatable area, an infrared ray repeater including a transmitter and a receiver for the infrared ray is used. This infrared ray repeater has a function to reflect a light signal and retransmit the received light signal after amplification. However, even if the infrared ray repeater is used, the infrared ray does not have a transparency of substance such as a wireless wave of ISM (Industrial Scientific Communication) band, and its ability of diffraction is low. Therefore, it is difficult that the infrared ray repeater is located at communicatable position for all devices in comparison with a repeater of a wireless wave. At a place where the infrared ray repeater is not located at communicatable position for all devices, it is difficult that the mutual communicatable area is extended by using the infrared ray repeater.

Furthermore, in case N devices set communication paths of connection type to mutually communicate, N(N−1)/2 connections must be set and each device must manage (N−1) connections. As a result, the processing load to manage the connections increases in proportion to the increase of the number of devices.

Even if one device can communicate to other devices to which the light does not directly reach by using the infrared ray repeater, each device must mutually set the connections through the infrared ray repeater. In order for N devices to mutually communicate, N(N−1)/2 connections must be set and managed. Therefore, the processing load to manage the connection increases in proportion to the increase of the number of devices.

SUMMARY OF THE INVENTION

It is an object of the present invention to provide a data communication apparatus and a method to mutually communicate for a plurality of devices even if the communicatable areas of the plurality of devices do not overlap.

According to the present invention, there is provided a data communication apparatus including a sending means and a receiving means for communicating a radio signal light as a carrier wave for a plurality of other devices each being the data communication apparatus, comprising: discrimination data generation means for generating discrimination data of own device through said sending means; direct communicatable device memory for, when said receiving means receives the discrimination data sent by the other device, storing the discrimination data of the other device as a direct communicatable device for the own device; direct communicatable device list generation means for generating a direct communicatable device list including the discrimination data stored in said direct communicatable device memory, and for sending the direct communicatable device list with the discrimination data of the own device through said sending means; indirect communicatable device memory for, when said receiving means receives the direct communicatable device list sent by the other device, storing the direct communicatable device list as an indirect communicatable device for the own device in relation to the discrimination data of the other device; user data processing means for selecting the discrimination data as a destination address from the discrimination data stored in said direct communicatable device memory and said indirect communicatable device memory, and for sending data with the destination address through said sending means; and relay means for, when said receiving means receives the data sent by the other device, deciding whether the destination address of the received data coincides with the discrimination data of the own device or the discrimination data stored in said direct communicatable device memory, and for relaying the received data to the direct communicatable device of the destination address through said sending means if the destination address coincides with the discrimination data of the direct communicatable device.

Further in accordance with the present invention, there is also provided a method for communicating data among a plurality of devices, each device includes a sending means and a receiving means for communicating a radio signal light as a carrier wave for other devices, comprising the steps of: sending discrimination data of own device; receiving the discrimination data from the other device; storing the discrimination data of the other device as a direct communicatable device for the own device; generating a direct communicatable device list including the destination stored at the storing step; sending the direct communicatable device list with the discrimination data of the own device; receiving the direct communicatable device list from the other device; storing the direct communicatable device list as an indirect communicatable device for the own device in relation to the discrimination data of the other device; selecting the discrimination data as a destination address from the destination data of the direct communicatable device and the indirect communicatable device; sending data with the destination address; receiving the data from the other device; deciding whether the destination address of the received data coincides with the discrimination data of the own device or the discrimination data of the direct communicatable device; and relaying the received data to the direct communicatable device of the destination address if the destination address coincides with the discrimination data of the direct communicatable device.

Further in accordance with the present invention, there is also provided a computer readable memory containing computer readable instructions in each of a plurality of devices to communicate data, each device includes a sending means and a receiving means for communicating a radio signal light as a carrier wave for other devices, comprising: instruction means for causing a computer to send discrimination data of own device; instruction means for causing a computer to receive the discrimination data from the other device; instruction means for causing a computer to store the discrimination data of the other device as a direct communicatable device for the own device; instruction means for causing a computer to generate a direct communicatable device list including the destination stored instruction means for causing a computer to send the direct communicatable device list with the discrimination data of the own device; instruction means for causing a computer to receive the direct communicatable device list from the other device; instruction means for causing a computer to store the direct communicatable device list as an indirect communicatable device for the own device in relation to the discrimination data of the other device; instruction means for causing a computer to select the discrimination data as a destination address from the destination data of the direct communicatable device and the indirect communicatable device instruction means for causing a computer to send data with the destination address; instruction means for causing a computer to receive the data from the other device; instruction means for causing a computer to decide whether the destination address of the received data coincides with the discrimination data of the own device or the discrimination data of the direct communicatable device; and instruction means for causing a computer to relay the received data to the direct communicatable device of the destination address if the destination address coincides with the discrimination data of the direct communicatable device.

BRIEF DESCRIPTION OF THE DRAWINGS

FIG. 7 is a schematic diagram of an example of a memory table according to the first embodiment.

FIG. 8 is a schematic diagram of an example of setting a connection path between two devices.

FIG. 9 is a schematic diagram of an example of setting a connection path among three devices.

FIG. 10 is a schematic diagram of a first example of data stored in the memory table according to the first embodiment.

FIG. 11 is a schematic diagram of a second example of data stored in the memory table according to the first embodiment.

FIG. 12 is a schematic diagram of a third example of data stored in the memory table according to the first embodiment.

FIG. 16 is a schematic diagram of setting of a connection path among six devices.

FIG. 17 is a schematic diagram of fourth example of data stored in the memory table according to the second embodiment.

FIG. 18 is a schematic diagram of the data packet of flag 4.

FIG. 19 is a schematic diagram of the data packet of flag 0.

FIG. 23 is a schematic diagram of a first example of communicatable area of four devices.

FIG. 24 is a schematic diagram of one example of a frame and the data packet.

FIG. 25 is a schematic diagram of a first example of structure of the memory table according to the third embodiment FIG. 26 is a schematic diagram of second example of structure of the memory table according to the third embodiment.

FIG. 27 is a schematic diagram of a first concrete example of data stored in the memory table according to the third embodiment.

DETAILED DESCRIPTION OF THE PREFERRED EMBODIMENTS

Figure 1A:
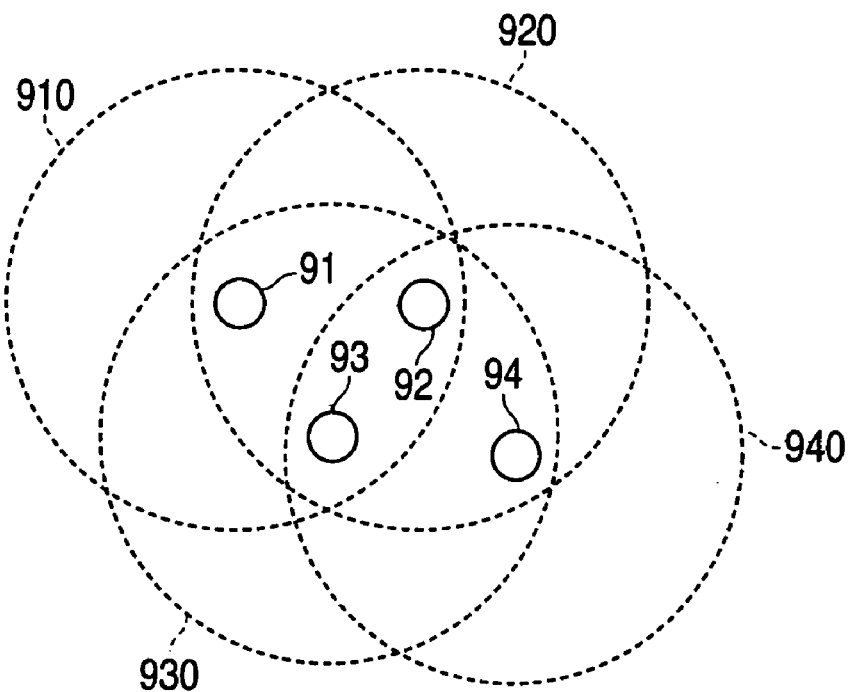
FIGS. 1A and 1B are schematic diagrams of an example of communicatable areas of four devices.
Figure 1B:
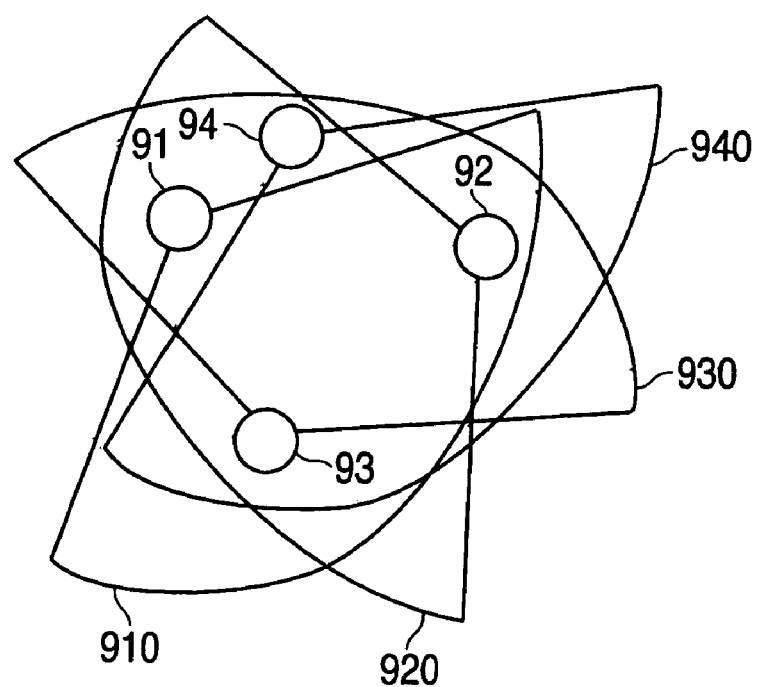
Figure 2:
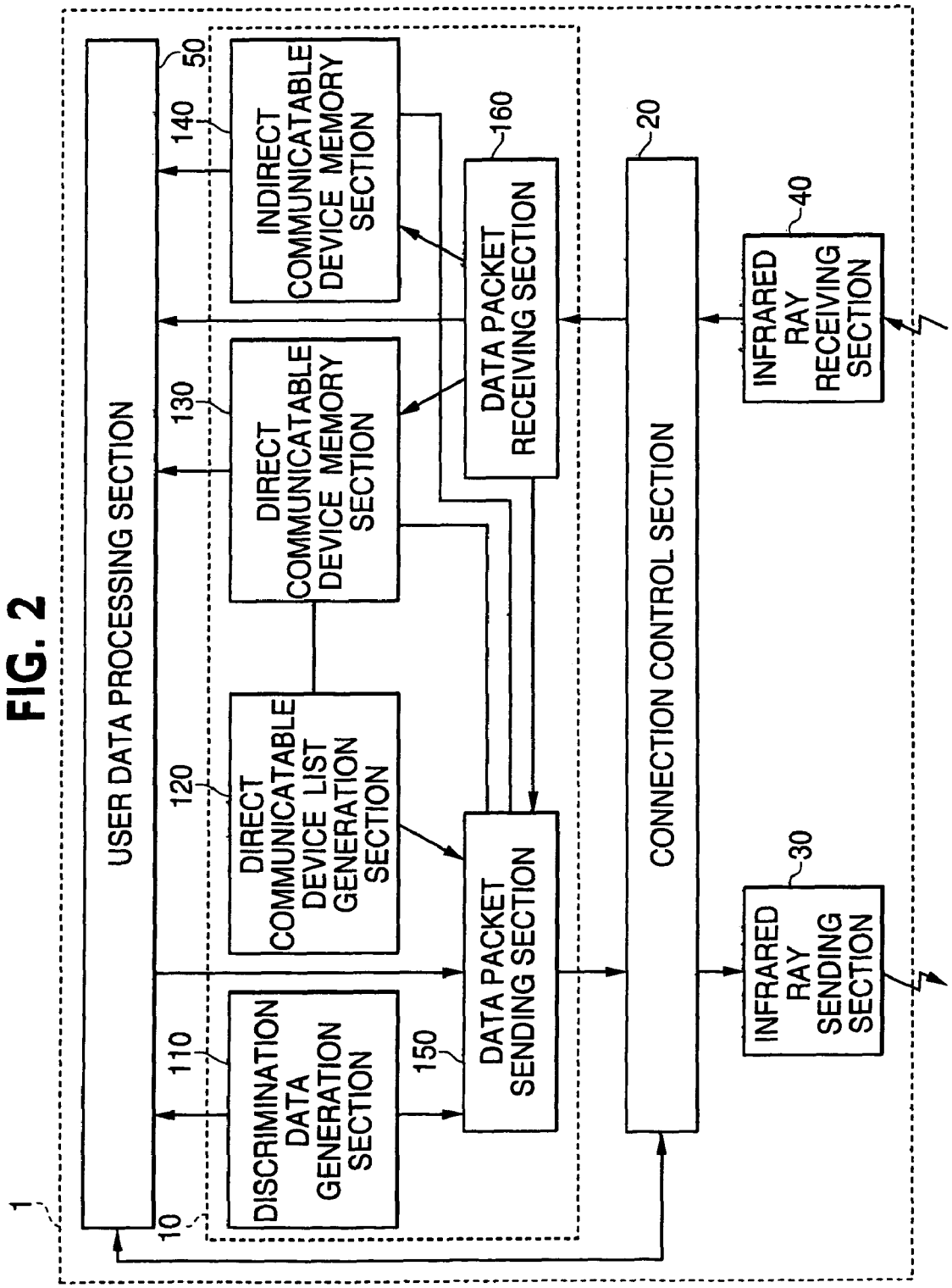
FIG. 2 is a block diagram of the data communicatable apparatus according to a first embodiment of the present invention.

Hereinafter, a first embodiment of the present invention will be explained by referring to FIGS. 2~12. FIG. 2 is a block diagram of an infrared ray communication device 1 according to the first embodiment. As shown in FIG. 2, the infrared ray communication device 1 includes a data communication processing section 10, a connection control section 20, an infrared ray sending section 30, an infrared ray receiving section 40, and a user data processing section 50. The data communication processing section 10 includes a discrimination data generation section 110, a direct communicatable device list generation section 120, a direct communicatable device memory section 130, an indirect communicatable device memory section 140, a data packet sending section 150, and a data packet receiving section 160.

The user data processing section 50 is regarded as an application activated by sending/receiving data, or a communication protocol module. The connection control section 20 sets a communication path of connection (Hereinafter, called "connection") to the connection control section of other device of communication opposite. This connection is discriminated by a connection identifier and informed to the data communication processing section 10 after setting the connection. When a packet to which the connection Identifier is indicated is received from the data communication processing section 10, the connection control section 20 adds the connection identifier as a destination address to the packet and generates a frame to which error correction data is attached. This frame is supplied to the infrared ray sending section 30. The infrared ray sending section 30 converts the frame as electrical signal to an infrared ray signal and radiates it into space. The infrared ray receiving section 40 receives the infrared ray signal sent by other device, converts it to a frame as electrical signal, and supplies the frame to the connection control section 20.

When the connection control section 20 receives the frame from the infrared ray receiving section 40, the connection control section 20 analyzes the frame and outputs a packet in the data packet to the data communication processing section 10 if the connection identifier of the own device is added to the frame. Furthermore, the connection control section 20 analyzes the error correction data added to the frame and sends a packet of request for retransmission of the frame to the other device of source address if the frame includes the error. When the other device receives the packet of request for retransmission, the connection control section 20 transmits the same frame again.

The connection control section 20 respectively sets each connection to a plurality of other devices. In short, sending/receiving of the frame is executed for the plurality of other devices by the each connection. In case of setting the each connection to the plurality of other devices, the connection control section 20 assigns the connection identifier to discriminate each connection.

Figure 3:
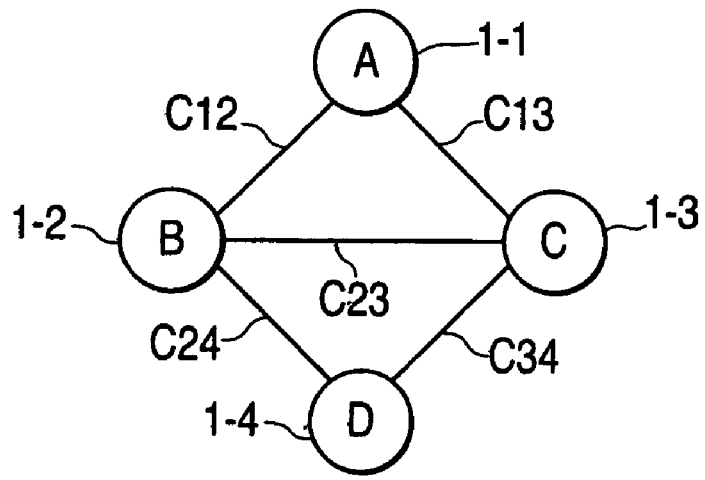
FIG. 3 is a schematic diagram of an example of setting a connection path among four devices.

In case of setting the connection, the opposite device to which the connection is set is called a direct communicatable device. For example, assume that four devices including the components of FIG. 3 are devices 1-1, 1-2, 1-3, 1-4. As shown in FIG. 3, the connection is set among the four devices. In this case, the direct communicatable device of the device 1-1 is two devices 1-2, 1-3, and the direct communicatable device of the device 1-2 is three devices 1-1, 1-3, 1-4.

In the infrared ray sending/receiving apparatus, IrDA (Infrared Data Association) defines the infrared ray sending section 30 and the infrared ray receiving section 40 as physical layer. Especially, in the first embodiment, the infrared ray sending/receiving apparatus of diffusion type called AIR (Advanced Infra-red) is used. The connection control section 20 is a protocol module defined by IrDA as "IrLAP, LM-MUX, IrMAC, IrLC". In this case, the connection control section 20 generates a device address to discriminate its device, and sends/receives a signal light including the device address through the infrared ray sending section 30 and the infrared ray receiving section 40. As for two devices to which the device address is exchangeable each other, the connection control section 20 of one device sends a signal light including a connection set request to the other device, and receives a signal light including a connection set response from the other device. In this way, the connection is set between the two devices. In this case, in response to indication from the user data processing section 50, the connection control section 20 sends the connection set request. However, the connection control section 20 may automatically set the connection between two devices to which the device address is exchangeable each other without the indication.

In the first embodiment, the infrared ray sending section 30 and the infrared ray receiving section 40 use the 4-PPM/VR (four values pulse position modulation/variable rate) method disclosed in reference (F. G feller, W. Hirt, M. Lange, and B. We iss, "Wireless Infrared Transmission: How to Reach All Office Space", IEEE, 46th VTC, Vol3, pp.1535–1539). 4-PPM/VR method is adaptable to a modulation method to vary a transmission speed according to the quality of the transmission path. In case of a bad quality transmission path, same pulse is repeatedly transmitted in order to amplify a signal element and eliminate the noise. For example, in case the receiving side obtains sufficient SN (signal-noise) ratio (influence of background light noise is low, or a distance between a transmitter of sending side and a receiver of receiving side is short), a high speed transmission as one time of pulse repeat (RR) is executed. In case the quality of the transmission path goes down and the error ratio of signal is high in spite of one time of pulse repeat of transmission, transmission as two times of pulse repeat is executed in order to improve the SN ratio. In case the quality of transmission further goes bad and the error ratio of signal is high in spite of two times of pulse repeat of transmission, transmission as four times of pulse repeat is executed in order to further improve the SN ratio. In this case, the transmission speed goes down in proportion to the increase of the time of pulse repeat. For example, the transmission speed becomes a half in case of two times of pulse repeat. The transmission speed becomes one fourth in case of four times of pulse repeat. In the first embodiment, the infrared ray sending section 30 and the infrared ray receiving section 40 packages 4-PPM/VR method to selectively use 4 Mbps (RR=1), 2 Mbps (RR=2), 1 Mbps (RR=4) as the transmission speed. In this case, "RR=4" represents modulation parameter as K times of pulse repeat. If the transmission speed of the connection changes, the connection control section 20 informs new transmission speed to the data communication processing section 10.

Hereinafter, component of the data communication processing section 10 is explained. A packet exchanged between two devices by the data communication processing section 10 is called a data packet. The data communication processing section 10 generates the data packet in case of sending data. The data packet includes an identifier to discriminate kind of the data packet. In the first embodiment, this identifier is called a flag. As for the data packet including data input from the user data processing section 50, flag 0 (Flag o) or flag 1 (Flag 1) is added. As for the data packet including data generated by the discrimination data generation section 110 or the direct communicatable device list generation section 120, flag 2 (Flag 2) and flag 3 (Flag 3) are respectively added. As for the data packet including data generated by a reservation identifier generation section 171 (second embodiment), flag 4 (Flag 4) is added.

The discrimination data generation section 110 generates or selects an address to discriminate the data communication processing section 110 of its device, and informs the address to the data packet sending section 150 and the data packet receiving section 160. The discrimination data generation section 110 generates a data packet including the address and outputs the data packet to the data packet sending section 150. The flag 2 is added to this data packet. Furthermore, the discrimination data generation section 110 informs the address to discriminate the data communication processing section 10 of its device to the user data processing section 50.

When the data packet receiving section 160 receives a data packet of flag 2 and data of the connection identifier sent by other device, the data packet receiving section 160 supplies the data packet of flag 2 and the data of the connection identifier to the direct communicatable device memory section 130. The direct communicatable device memory section 130 extracts the address to discriminate the data communication processing section of a direct communicatable device from the data packet and stores the address and the connection identifier as a pair. Furthermore, the address of the direct communicatable device is informed to the user information processing section 50.

After the addresses of all direct communicatable devices are obtained from the received data packets, the direct communicatable device list generation section 120 generates a list including the addresses of all direct communicatable devices stored in the direct communicatable device memory section 130 hereinafter, the list generated by the direct communicatable device list generation section 120 is called an address list. After generating the address list, the direct communicatable device list generation section 120 generates a data packet including the address list, and outputs it to the data packet sending section 150. The flag 3 is added to the data packet generated by the direct communicatable device list generation section 120.

When the data packet receiving section 160 receives a data packet of flag 3 and data of the connection identifier sent by other device, the data packet receiving section 160 supplies them to the indirect communicatable device memory section 140. The indirect communicatable device memory section 140 extracts the address list generated by the direct communicatable device from the data packet, and stores the address list and the connection identifier-as a pair. Furthermore, the addresses except for the current device address and the direct communicatable device are extracted from the address list, and informed to the user information processing section 50. Hereinafter, the device of the address in the address list except for the current device and the direct communicatable device is called an indirect communicatable device. In case of sending data, the user data processing section 50 selects the address of the destination device stored in the direct communicatable device memory section 130 and the indirect communicatable device memory section 140 and outputs the data to the data packet sending section 150.

When the data packet sending section 150 receives a data packet of flag 2 from the discrimination data generation section 110, the data packet sending 150 stores the data packet. If a new connection from which the data packet of flag 2 is not sent is set, the data packet sending section 150 indicates the connection identifier of the new connection, and outputs the stored data packet of flag 2 to the connection control section 20.

When the data packet sending section 150 receives a data packet of flag 3 from the direct communicatable device list generation section 120, the data packet sending section 150 copies the data packet as a number of the connection from which the data packet of flag 2 is already sent, indicates the connection identifier of the number of the connection in order, and respectively outputs the copied data packet with each of the connection identifier to the connection control section 20.

When the data packet sending section 150 receives the data and the address of a destination device from the user data processing section 50, the data packet sending section 150 generates a data packet of flag 1 including the data and the address of the destination device. Next, the data packet sending section 150 refers a relation between the address and the connection identifier stored in the direct communicatable device memory section 130 and the indirect communicatable device memory section 140, retrieves one connection identifier corresponding to the address of destination address, and outputs the data packet with the one connection identifier to the connection control section 20. A method for selecting the connection identifier is the same as the sending process of data packet of flag 1 of the data communication processing section 10 explained afterwards.

When the data packet receiving section 160 receives a data packet sent by other device through the connection control section 20, the data packet receiving section 160 confirms a flag value in the data packet. In case of flag 1, the data packet is output to the user data processing section 50. In case of flag 2, the data packet is output to the direct communicatable device memory 130. In case of flag 3, the data packet is output to the indirect communicatable device memory 140. However, in case of flag 1, the address in the data packet is analyzed. If the address coincides with an address of the current device, the data packet is output to the user data processing section 50. In case of incoincidence, the data packet is processed by receiving process of data packet of flag 1 of the data communication processing section 10. Furthermore, when the data packet receiving section 160 outputs the data packet of flag 2 or flag 3 to the direct communicatable device memory section 130 or the indirect communicatable device memory 140, the connection identifier of the connection through which the data packet is transmitted is informed together with the data packet.

Figure 4:
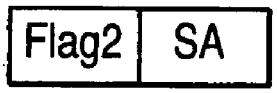
FIG. 4 is a schematic diagram of a data packet of flag 2.

Hereinafter, concrete example of structure of the data packet is explained. FIGS. 4~7 show examples of the data packet. FIG. 4 shows one example of the data packet of flag 2 generated by the discrimination data generation section 110. The data packet of flag 2 includes address (SA) of the data communication processing section 10 of the own device.

Figure 5:
FIG. 5 is a schematic diagram of the data packet of flag 3.

FIG. 5 shows one example of the data packet of flag 3 generated by the direct communicatable device list generation section 120. The data packet of flag 3 includes the address (SA) of the data communication processing section of the current device, the number (N1) of all direct communicatable devices, and each address (DA #1~DA#n1) of all direct communicatable devices.

Figure 6:
FIG. 6 is a schematic diagram of the data packet of flag 1.

FIG. 6 shows one example of the data packet of flag 1 generated by the data packet sending section 150. The data packet of flag 1 includes the address (DA) of the data communication processing section of destination device, the address (SA) of the data communication processing section of the own device, the data (Data) input from the user data processing section 50. In this case, the data packet is not limited to above-mentioned structure. For example, a value representing data packet length may be included. A line of each field in the data packet shown in FIGS. 4~6 may be different.

Next, FIG. 7 shows a memory table to store the connection identifier, the address of the direct communicatable device, and the address list sent by the direct communicatable device. This memory table is commonly used by the data packet sending section 150, the data packet receiving section 160, the direct communicatable device memory section 130, the indirect communicatable device memory section-140. As shown in the memory table of FIG. 7, the connection identifier of set connection, a quality of the set connection, the address of the direct communicatable device, and the address list sent by the direct communicatable device are stored as one unit. In the first embodiment, after setting the connection, the data packet sending section 150 or the data packet receiving section 160 receives parameter value of transmission speed as the quality of connection with the connection identifier. In this case, the data packet sending section 150, the data packet receiving section 160, the direct communicatable device memory section 130, the indirect communicatable device memory section 140 may respectively manage each memory table including different structure element.

Hereinafter, concrete example of update method of the memory table is explained. As for four devices 1-1, 1-2, 1-3, 1-4 each including component of FIG. 2, the address to discriminate the data communication processing section 10 of each device is A, B, C, D. Furthermore, if a connection is set between first device 1-X (X=1, 2, 3, 4) and second device 1-Y (Y=1, 2, 3, 4), the connection identifier of the set connection is Cxy. An example to entry in the memory table of the device 1-1 (address A) is explained.

Firstly, as shown in FIG. 8, if the connection is set between the device 1-1 and the device 1-2, the data packet sending section 150-1 or the data packet receiving section 160-1 of the device 1-1 entries C12 in column t11 of the memory table of FIG. 7 and a transmission speed obtained from the connection control section 20-1 in column t21. At this timing, the device 1-1 sends the data packet of flag 2 generated by the discrimination data generation section 110-1 to the device 1-2. Secondly, as shown in FIG. 9, if the connection is set between the device 1-1 and the device 1-3 and between the device 1-2 and the device 1-3, the data packet sending section 150-1 or the data packet receiving section 160-1 enters C13 in column t12 of the memory table and the transmission speed obtained from the connection control section 20-1 in column t22. At this timing, the device 1-1 sends the data packet of flag 2 generated by the discrimination data generation section 110-1 to the device 1-3. Thirdly, when the device 1-1 receives the data packet of flag 2 sent by the device 1-2, the direct communicatable device memory section 130-1 of the device 1-1 enters address B of the device 1-2 in column t31 of the memory table. Fourthly, when the device 1-1 receives the data packet of flag 2 sent by the device 1-3, the direct communicatable device memory section 130-1 of the device 1-1 enters address C of the device 1-3 in column t32 of the memory table. Fifthly, when the device 1-1 receives the data packet of flag 3 sent by the device 1-2, the indirect communicatable device memory section 140-1 or the device 1-1 enters the address list sent by the device 1-2 in column t41 of the memory table. The address list sent by the device 1-2 includes address of devices to which the device 1-2 set the connection. At this timing, if the device 1-2 sets the connection to the device 1-1 and the device 1-3, addresses A, C are entried in column t41. Sixthly., when the device 1-1 receives the data packet of flag 3 sent by the device 1-3, the indirect-communicatable device memory section 140-1 of the device 1-1 entries the address list sent by the device 1-3 in column t42 of the memory table. The address list sent by the device 1-3 includes addresses to which the device 1-3 sets the connection. At this timing, if the device 1-3 sets the connection to the device 1-1 and the device 1-2, addresses A, B are entried in column t42. As a result of above six processes, content of the memory table is updated as shown in FIG. 10. In this case, the transmission speed of connection between the device 1-1 and the device 1-2 is 1 Mbps, and the transmission speed of connection between the device 1-1 and the device 1-3 is 2 Mbps.

Seventhly, as shown in FIG. 3, if the connection is set between the device 1-2 and the device 1-4, and between the device 1-3 and the device 1-4, the direct communicatable device of the devices 1-2, 1-3 change. Therefore, the devices 1-2, 1-3 respectively generate the data packet of flag 3 again, and sends it to their direct communicatable-device. As a result, the device 1-1 receives the data packet of flag 3 sent by the device 1-2 again, and the indirect communicatable device memory section 140-1 of the device 1-1 entries new address list sent by the device 1-2 in column t41 of the memory table. Furthermore, the device 1-1 receives the data packet of flag 3 sent by the device 1-3 again, and the indirect communicatable device memory section 140-1 of the device 1-1 entries new address list sent by the device 1-3 in column t42 of the memory table. As a result of seventh process, content of the memory table is updated as shown in FIG. 11.

Eighthly, when the data packet sending section 150-1 or the data packet receiving section 160-1 of the device 1-1 receives a information from the connection control section 20-1 and detects that the transmission speed of connection set to the device 1-2 changed from 1 Mbps to 4 Mbps, "4 Mbps" is entried in column t21 of the memory table. In the first embodiment, the transmission speed as the quality of connection is entried in the memory table. However, the times of pulse repeat (RR) of 4-PPM/VR method may be entried.

Hereinafter, a process for the direct communicatable device list generation section 120 to send the address list is explained. When the direct communicatable device list generation section 120 detects the connection set, a timer for generating the list starts. At a timing of time-out of the timer, the direct communicatable device list generation section 120 confirms the memory table. If the addresses corresponding to all connection identifiers entered are registered, the direct communicatable device list generation section 120 generates the data packet of flag 3 by referring to the addresses in the memory table. At the timing of time-out, if the addresses corresponding to all connection identifies entered in the memory-table are not registered, the timer for generating the list starts again.

Hereinafter, a function for the direct communicatable device memory section 130 and the indirect communicatable device memory section 140 to inform the addresses of the direct communicatable device and the indirect communicatable device to the user data processing section 50 is explained. The direct communicatable device memory section 130 has a function to inform the address of the direct communicatable device to the user data processing section 50. For example, if the memory table as shown in FIG. 7 is managed, the direct communicatable device memory section 130 informs the address stored in line of the address to the user data processing section 50. In short, in case of the content of the memory table shown in FIGS. 10 and 11, addresses B, C of the direct communicatable device are informed to the user data processing section 50. An information of address from the direct communicatable device memory section 130 to the user data processing section 50 is executed in response to a request from the user data processing section 50. However, the information may be executed in case of change of content of the memory table, or may be periodically executed.

The indirect communicatable device memory section 140 has a function to inform the addresses of the indirect communicatable device to the user data processing section 50. For example, if the memory table as shown in FIG. 7 is managed, the indirect communicatable device memory section 140 confirms a line of the address list and informs addresses entered in the address list except for the addresses of its device and of the direct communicatable device. In short, in case of the content of the memory table shown in FIG. 11, "D" in the address list is not included in a line of the address (direct communicatable device) and "D" as address of the indirect communicatable device is informed to the user data processing section 50. On the other hand, in case of the content of the memory table shown in FIG. 10, addresses entered in the address list are included in a line of the address (direct communicatable device). Therefore, address information of the indirect communicatable device to the user data processing section 50 is not executed, or non-existence of the indirect communicatable device is informed to the user data processing section 50. An information of address from the indirect communicatable device memory section 140 to the user data processing section 50 is executed in response to a request from the user data processing section 50. However, the information may be executed in case of change of content of the memory table, or may be periodically, executed.

Next, a process for the data communication processing section 10 to send the data packet of flag 1 is explained. The user data processing section 50 outputs data with the address of the destination device to the data packet sending section 150. This destination address is obtained from the direct communicatable device memory section 130 or the indirect communicatable device memory section 140. When the data packet sending section 150 receives the data with destination address from the user data processing section 50, the data packet sending section 150 generates the data packet of flag 1. Furthermore, the data packet sending section 150 confirms the destination address and selects the connection identifier of connection to send the data packet to the destination device.

The data packet sending section 150 selects the connection identifier by the following rule.

In case the destination address is the direct communicatable device:

Address entered in line of the address is confirmed. The connection identifier corresponding to the destination address in the line is selected.

In case the destination address is the indirect communicatable device:

Address entered in line of the address list is confirmed. If the same address is entered in plural lines of the address list, the qualities entered in the plural lines are compared. The connection identifier whose quality is highest (For example, the highest transmission speed) is selected.

For example, if the memory table shown in FIG. 11 is created, the data packet sending section 150 selects C12 in case of the destination address B and selects C13 in case of the destination address C. On the other hand, in case of the destination address D, this address D is included in both columns t41, t42. Therefore, two qualities of columns t21, t22 are compared and the connection identifier C13 corresponding to higher transmission speed "2 Mbps" is selected. As a comparison result of quality of connection, for example, if a plurality of connections of the same quality (same transmission speed) are entered in the memory table, values of each connection identifier of the plurality of connections are compared, and the connection identifier having the largest value is selected. After selecting the connection identifier, the data packet sending section 150 outputs the data packet of flag 1 with the selected connection identifier to the connection control section 20. In the first embodiment, if a plurality of connections of the same quality are entered, the connection identifier having the largest value is selected. However, arbitrary algorithm to determine one connection identifier may be used. For example, the connection identifier of the smallest value may be selected.

Next, a process for the data communication processing section 10 to receive the data packet of flag 1 is explained. When the data packet receiving section 160 receives the data packet of flag 1, the data packet receiving section 160 confirms the destination address in the data packet. If the destination address coincides with the address of the current device, data and address of source device in the data packet are informed to the user data processing section 50. On the other hand, if the destination address does not coincide with the address of the current device, the data packet receiving section 160 confirms the memory table. If the destination address is entried in a line of the address (direct communicatable destination address) of the memory table, the data packet receiving section 160 selects a connection identifier corresponding to the destination address and outputs the data packet of flag 1 with the connection identifier to the connection control section 20. For example, in a situation shown in FIG. 3, assume that the device 1-3 is created in the memory table shown in FIG. 12. When the device 1-3 receives the data packet including the destination address D sent by the device 1-1, the data packet receiving section 160-3 of the device 1-3 confirms the destination address in the data packet. In this case, the destination address D does not coincide with the address of the current device, and the data packet receiving section 160-3 confirms the memory table. In case of the memory table shown in FIG. 12, the destination address D is entered in a line of the address (direct communicatable destination address). Therefore, the data packet receiving section 160-3 selects a connection identifier C34 corresponding to the destination address D and outputs the data packet with the connection identifier C34 to the connection control section 20-3.

(Second Embodiment)

Figure 13:
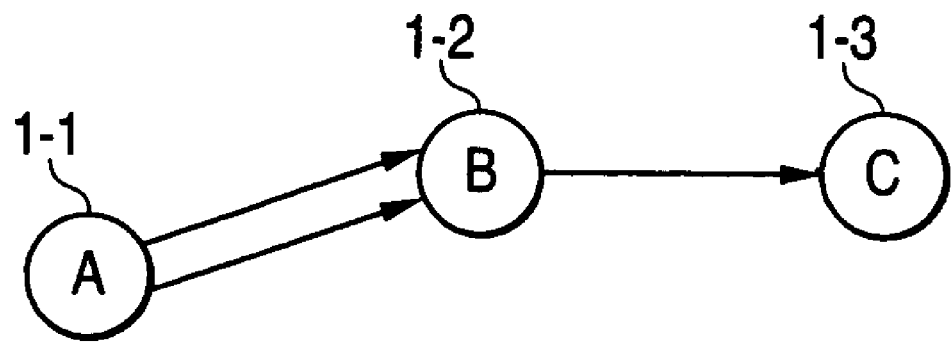
FIG. 13 is a schematic diagram of setting of the connection path among three devices according to the first embodiment.
Figure 14:
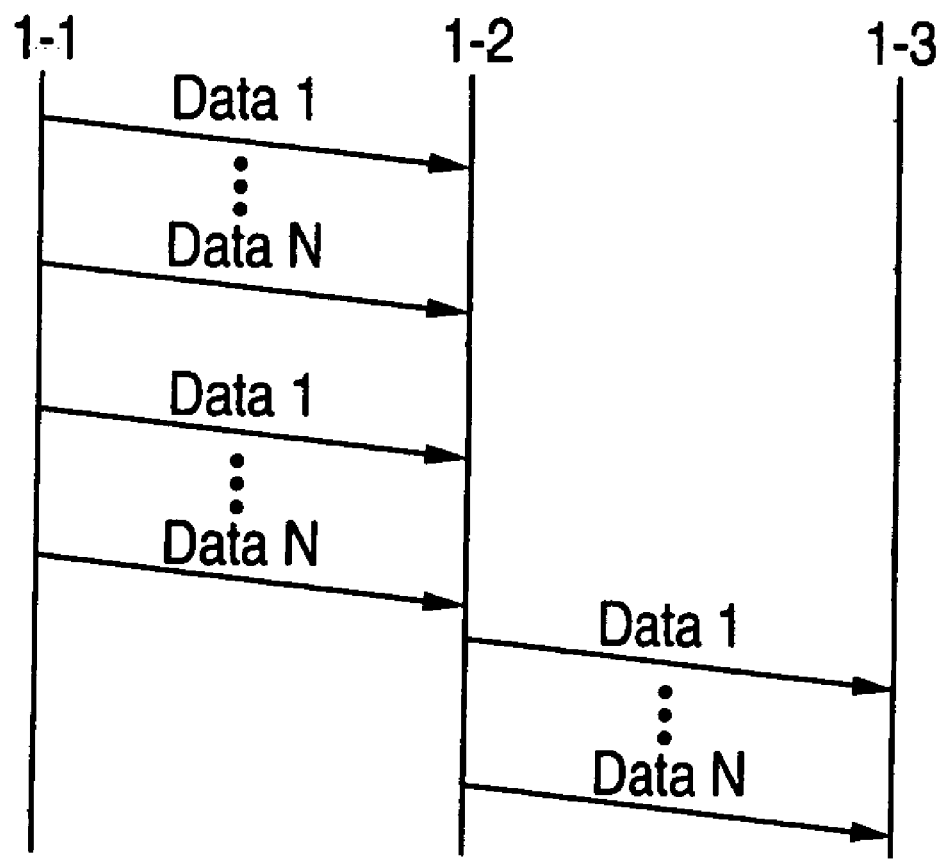
FIG. 14 is a diagram of relay of the data packet among three devices according to the first embodiment.

In the first embodiment, in order for the data communication processing section 10 to present a broadcast data transmission service to the user data processing section 50 by using the connection, unicast to all of direct communicatable devices and indirect communicatable devices must be repeatedly executed. However, in this case, as shown in FIGS. 13 and 14, same data is repeatedly transmitted to the direct communicatable device of a relay device, and transmission efficiently goes down. Therefore, in the second embodiment, a relay transfer is previously indicated to the direct communicatable device of the relay device. In case of receiving data of transfer indication, the relay device automatically transfers the data to the destination device. In short, effective broadcast service is presented in comparison with repeated unicast.

Figure 15:
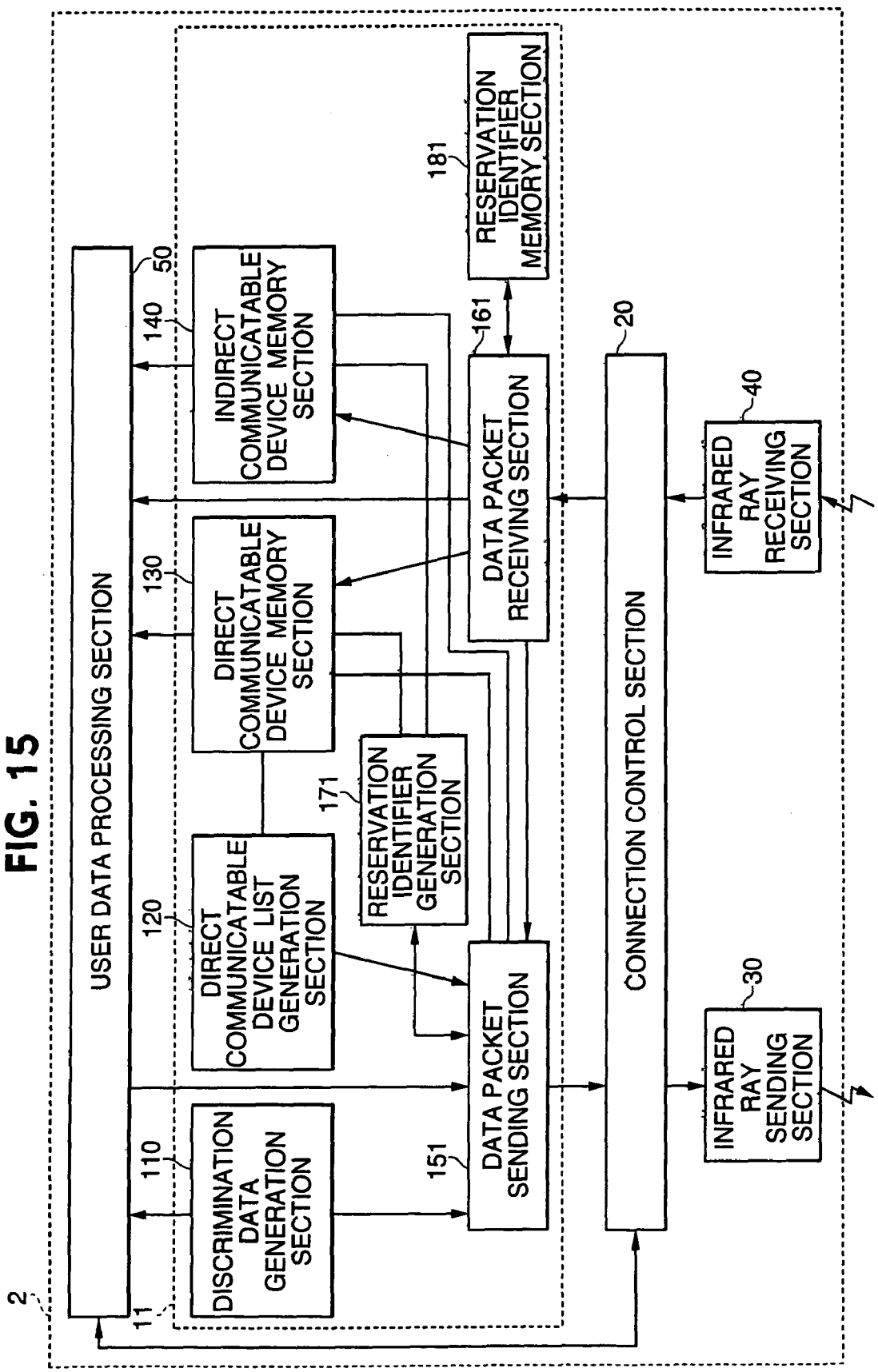
FIG. 15 is a block diagram of the data communication apparatus according to a second embodiment of the present invention.

Hereinafter, the second embodiment of the present invention will be explained by referring to FIGS. 15~21. FIG. 15 is a block diagram of an infrared ray communication device 2 according to the second embodiment. As shown in FIG. 15, the infrared ray communication device 2 includes a data communication processing section 11, a connection control section 20, an infrared ray sending section 30, an infrared ray receiving section 40, and a user data processing section 50. The data communication processing section 11 includes a discrimination data generation section 110, a direct communicatable device list generation section 120, a direct communicatable device memory section 130, an indirect communicatable device memory section 140, a data packet sending section 151, a data packet receiving section 161, a reservation identifier generation section 171, and a reservation identifier memory section 181. In the data communication processing section 11 of the infrared ray communication device 2, each section except for the reservation identifier generation section 171 and the reservation identifier memory section 181 are the same as in the first embodiment in FIG. 2. In addition to this, the data packet sending section 151 and the data packet receiving section 161 respectively have a function explained afterwards.

The reservation identifier generation section 171 generates a reservation identifier used for reservation of relay transfer to the direct communicatable device. A device to broadcast previously informs the reservation identifier and the address of indirect communicatable device as transfer destination to the direct communicatable device. Then, in case of sending the data packet with the reservation identifier to the direct communicatable device, the direct communicatable device automatically transfers the data packet to the indirect communicatable device previously informed. The reservation identifier generation section 171 monitors the memory table in FIG. 7 generated by the direct communicatable device memory section 130 and the indirect communicatable device memory section 140. If the direct communicatable device is newly registered or deleted in the memory table, change flag of reservation identifier is set. In response to a broadcast request signal from the data packet sending section 151, the reservation identifier generation section 171 resets the change flag and generates the reservation identifier of which value is different from initial value and previous reservation value.

Next, by referring to the memory table, the reservation identifier generation section 171 temporarily stores a relation between address of the direct communicatable device and address of the indirect communicatable device corresponding to same connection identifier. However, if an address of the indirect communicatable device is in plural lines of the address list, the qualities of connections corresponding to the plural lines are compared, and a relation of address of the direct communicatable device and address of the indirect communicatable device corresponding to the connection of highest quality is only stored. For example, assume that six devices including component of the communication device 2 are respectively devices 2-1., 2-2, 2-3, 2-4, 2-5, 2-6 and the address to discriminate the data communication processing section in each device is A, B, C, D, E, F. In case a connection is set between the device 2-X (X=1, 2, 3, 4, 5, 6) and the device 2-Y (Y=1, 2, 3, 4, 5, 6), the connection identifier of the connection is Cxy. As shown in FIG. 16, assume that the connection control section of device 2-1, 2-2, 2-3, 2-4, 2-5, 2-6 sets the connection, and the device 2-1 generates the memory table shown in FIG. 17. In this case, the reservation identifier generation section 171 of the device 2-1 stores the relation (B:E), (C:D, F).

Next, by referring to this stored relation, the reservation identifier generation section 171 generates the data packet shown in FIG. 18, and outputs it to the data packet sending section 151. In case of completion of output of all data packet to the data packet sending section 151, the reservation identifier generation section 171 outputs a broadcast confirmation signal to the data packet sending section 151. The generated reservation identifier is entered in the broadcast confirmation signal. The data packet generated by the reservation identifier generation section 171 includes, a flag 4, the address of the direct communicatable device as destination address (DA), the address of own device as source address (SA), the reservation identifier (RID), the number of the indirect communicatable device (N2), and the address of each indirect communicatable device (DA#1~DA#n2) corresponding to the direct communicatable device (DA).

When the data packet receiving section 161 receives the data packet of flag 4 sent by another device, the reservation identifier memory section 181 receives the data packet of flag 4 through the data packet receiving section 161 and stores a relation among the reservation identifier, the source address, and the addresses of transfer destination devices.

In case of sending data by broadcast, the user data processing section 50 indicates an address of broadcast and inputs the data to the data packet sending section 151. In response to the data packet with a broadcast address input from the user data processing section 50, the data packet sending section 151 confirms a status of change flag of reservation identifier in the reservation identifier generation section 171. In case of setting the change flag, the data packet sending section 151 outputs a broadcast request to the reservation identifier generation section 171. Then, in response to the data packet of flag 4 input from the reservation identifier generation section 171, the data packet sending section 151 sends the data packet with the connection identifier corresponding to the destination address to the connection control section 20. Then, in response to a broadcast confirmation input from the reservation identifier generation section 171, the data packet sending section 151 stores the reservation identifier in the broadcast confirmation and generates a data packet for broadcast as shown in FIG. 19 in order to broadcast the data to all direct communicatable devices. The data packet for broadcast includes flag 0, the address of the direct communicatable device as destination address (DA), the address of the own device as source address (SA), value of the reservation identifier as "RID", and the data input from the user data processing section as "Data". In this case, the data packet for broadcast is respectively created for each direct communicatable device and outputted with corresponding connection identifier to the connection control section 20 in order. On the other hand, as a confirmation result of status of the change flag of the reservation identifier, in case of reset of the reservation identifier, the data packet sending section 151 respectively generates the data packet for broadcast for each direct communicatable device in order to send the broadcast data to all direct communicatable devices. Then, the data packet sending section 151 respectively outputs the data packet with corresponding connection identifier to the connection control section 20 in order. In the data packet for broadcast, the reservation identifier stored in the reservation identifier generation section 171 is entered.

When the data packet receiving section 161 receives the data packet of flag 0 sent by another device, the data packet receiving section 161 informs the data and the address of source device in the data packet to the user data processing section 50 and confirms the value of the reservation identifier in the data packet. If the reservation identifier coincides one of reservation identifiers stored in the reservation identifier memory section 181, the received data packet of flag 0 is output to the data packet sending section 151. In response to input of the data packet of flag 0, the data packet sending section 151 retrieves the address of destination device corresponding to the reservation identifier in the data packet from the reservation identifier memory section 181. If the retrieved address represents the direct communicatable device, the data packet sending section 151 enters the retrieved address as destination address (DA), an initial value of the reservation identifier as "RID" in the data packet, and outputs the data packet with corresponding connection identifier to the connection control section 20. If a plurality of addresses of the destination devices corresponding to the reservation identifier are stored in the reservation identifier memory section 181, the data packet sending section 151 copies the data packet in order to respectively transfer to each direct communicatable device as the destination device. Then, the data packet sending section 151 changes the destination address (DA) and the reservation identifier (RID) in the data packet and outputs the data packet with corresponding connection identifier to the connection control section 20.

Figure 20:
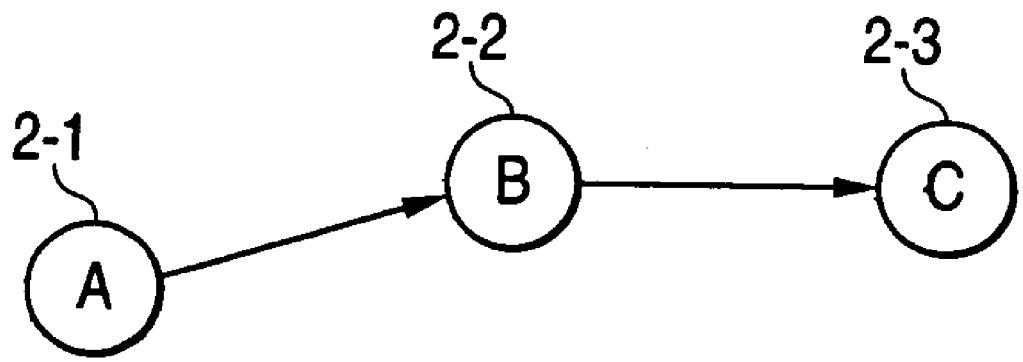
FIG. 20 is a schematic diagram of setting a connection path according to the second embodiment.
Figure 21:
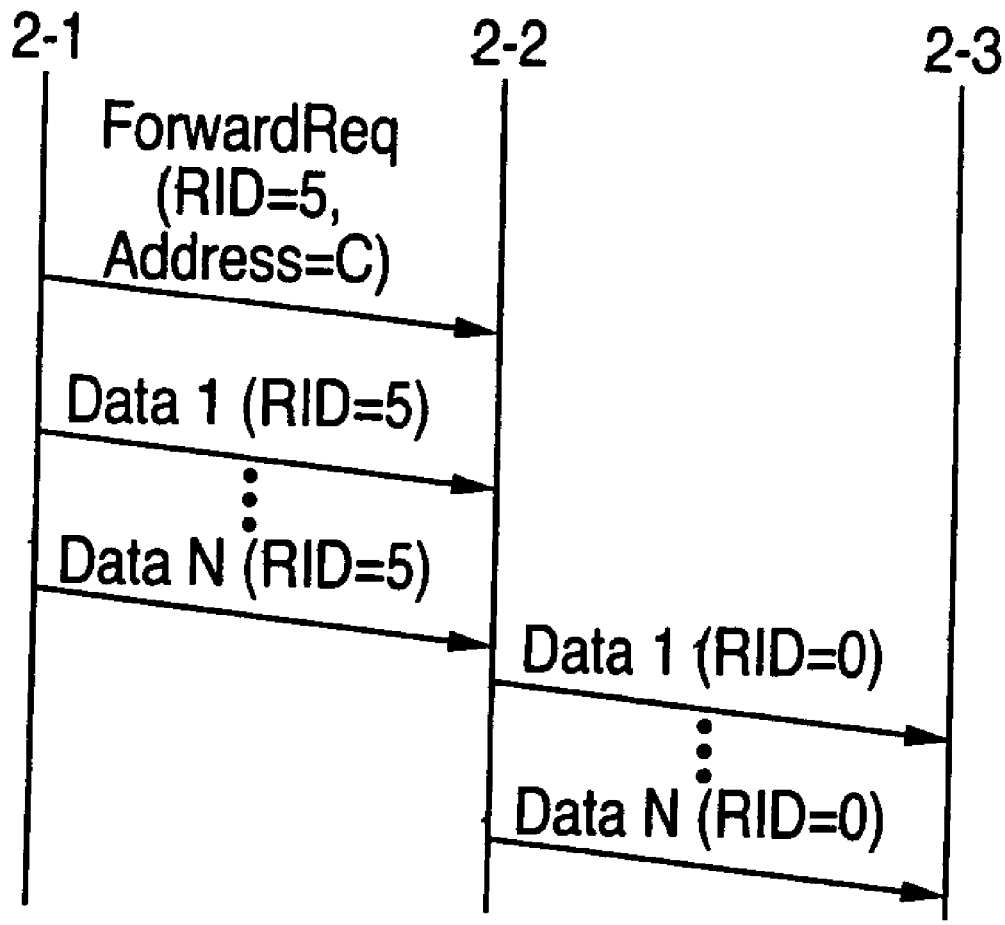
FIG. 21 is a diagram of relay of the data packet among three devices according to the second embodiment.

As mentioned-above, in the second embodiment, the indication of relay transfer is previously sent to the direct communicatable device as relay device. When this relay device receives broadcast data, the relay device automatically transfers the broadcast data to the destination device. Therefore, in comparison with repeated execution of unicast, effective broadcast service is presented. For example, as shown in FIG. 20, assume that the connection is set between the device 2-1 and the device 2-2 and between the device 2-2 and the device 2-3. If the device is 2-1 is not directly communicatable to the device 2-3, the device 2-1 previously sends the reservation identifier (RID) 5 and address C of destination device to the device 2-2. Then, when the device 2-1 sends the data packet with "RID=5" to the device 2-2, the device 2-2 obtains the data packet for own device 2-2. In addition to this, the device 2-2 automatically transfers the data packet to the device 2-3. Assume that the device 2-1 sends N units of data to the device 2-2 and the device 2-3. In comparison with the transfer method of the prior art shown in FIGS. 13 and 14, the device 2-1 can omit the data transmission of (N−1) units as shown in FIG. 21.

(Third Embodiment)

Hereinafter, the third embodiment of the present invention is explained. The component of the infrared ray communication device of the third embodiment is the same as in the first embodiment. However, sending process of the data packet of flag 1 by the data communication processing section 10 is different. The user data processing section 50 outputs the data packet with the destination address to the data packet sending section 150. This destination address is obtained from the direct communicatable device memory section 130 and the indirect communicatable device memory section 140.

When the data packet sending section 150 receives the data with destination address from the user data processing section 50, the data packet sending section 150 generates the data packet of flag 1. Furthermore, the data packet sending section 150 confirms the destination address and selects the connection identifier of connection to send the data packet to the destination device.

The data packet sending section 150 selects the connection identifier by the following rule.

In case the destination address is the direct communicatable device:

Address entered in line of the address is confirmed. The connection identifier corresponding to the destination address in the line is selected In case the destination address is the indirect communicatable device:

Address entered in line of the address list is confirmed. If the same address is entered in plural lines of the address list, the qualities entried in the plural lines are compared. The connection identifier whose quality is highest (For example, the highest transmission speed) is selected.

For example, if the memory table shown in FIG. 11 is created, the data packet sending section 150 selects C12 in case of the destination address B and selects C13 in case of the destination address C. On the other hand, in case of the destination address D, the address D is included in both columns t41, t42. Therefore, two qualities of columns t21, t22 are compared, and the connection identifier C13 corresponding to higher transmission speed "2 Mbps" is selected. As a comparison result of quality of connection, for example, if a plurality of connections of the same quality (same transmission speed) are entried in the memory table, values of each connection identifier of the plurality of connections are compared and the connection identifier having the largest value is selected. After selecting the connection identifier, the data packet sending section 150 outputs the data packet of flag 1 with the selected connection identifier to the connection control section 20.

The data packet sending section 150 stores a combination of the destination address and the connection identifier. Then, when the user data processing section 50 inputs the data and the destination address, if the combination of the destination address and the connection identifier is already stored, the data packet sending section 150 outputs the data packet of flag 1 with the connection identifier to the connection control section 20 without selecting process of the connection identifier.

When the data packet sending section 150 stores the combination of the destination address and the connection identifier, a timer for selecting the connection identifier starts. In case of time-out of the timer, the data packet sending section 150 selects the connection identifier of the connection to send the data packet to the destination device according to the above-mentioned selection process, and stores a combination of the destination address and the connection identifier again.

In the first embodiment, the connection identifier is selected whenever the data packet is sent. However, in the third embodiment, selection process of the connection identifier is periodically executed. Therefore, in case data to same destination device is continually input from the user data processing section 50, processing load of the connection identifier is reduced.

(Fourth Embodiment)

Hereinafter, the fourth embodiment of the present invention is explained. The components of the infrared ray communication device of the fourth embodiment is the same as the first embodiment. However, sending process of the data packet of flag 1 by the data communication processing section 10 is different from the first and third embodiments. The user data processing section 50 outputs the data packet with the destination address to the data packet sending section 150. This destination address is obtained from the direct communicatable device memory section 130 and the indirect communicatable device memory section 140.

When the data packet sending section 150 receives the data with destination address from the user data processing section 50, the data packet sending section 150 generates the data packet of flag 1. Furthermore, the data packet sending section 150 confirms the destination address and selects the connection identifier of the connection to send the data packet to the destination device.

The data packet sending section 150 selects the connection identifier by the following rule.

In case the destination address is the direct communicatable device:
Address entered in line of the address is confirmed. The connection identifier corresponding to the destination address in the line is selected.

In case the destination address is the indirect communicatable device:
Address entered in line of the address list is confirmed. If the same address is in plural lines of the address list, the qualities entried in the plural lines are compared. The connection identifier whose quality is highest (For example, the highest transmission speed) is selected.

For example, if the memory table shown in FIG. 11 is created, the data packet sending section 150 selects C12 In case of the destination address B, and selects C13 in case of the destination address C. On the other hand, in case of the destination address D, this address D is included in both columns t41, t42. Therefore, two qualities of columns t21, t22 are compared, and the connection identifier C13 corresponding to higher transmission speed "2 Mbps" is selected. As a comparison result of quality of connection, for example, if a plurality of connections of same quality (same transmission speed) are entried in the memory table, values of each connection identifier of the plurality of connections are compared and one connection identifier of largest value is selected. After selecting the connection identifier, the data packet sending section 150 outputs the data packet of flag 1 with the selected connection identifier to the connection control section 20.

The data pocket sending section 150 stores a combination of the destination address and the connection identifier. Then, when the user data processing section 50 inputs the data and the destination address, if the combination of the destination address and the connection identifier is already stored, the data packet sending section 150 outputs the data packet of flag 1 with the connection identifier to the connection control section 20 without selecting process of the connection identifier when the data packet sending section 150 stores the combination of the destination address and the connection identifier, the data packet sending section 150 monitors the status of the connection set by the connection control section 20. In case of detecting change of connection status (For example, new connection is set, the connection is cut, a transmission speed of the connection changes), the data packet sending section 150 selects the connection identifier of connection to send the data packet according to above-mentioned selection process.

In the first embodiment, the connection identifier is selected whenever the data packet is sent. However, in the fourth embodiment, the selection process of the connection identifier is executed in case of detecting the change of the connection status. Therefore, if the status of the connection does not frequently change, the processing load of selecting the connection identifier is reduced in comparison with the first embodiment. Furthermore, in the third embodiment, the selection process of the connection identifier is periodically executed. Therefore, if the connection is cut immediately after selecting the connection identifier, the data packet is not correctly transmitted. On the other hand, in the fourth embodiment, the selection process of the connection identifier is executed when the status of the connection changes. Accordingly, the data packet is correctly transmitted.

(Fifth Embodiment)

Hereinafter, the fifth embodiment of the present invention is explained. The component of the infrared ray communication device of the fifth embodiment is the same as in the second embodiment. The reservation identifier generation section 171 includes the following functions. The reservation identifier generation section 171 monitors the memory table shown in FIG. 7. In addition to the case that the direct communicatable device is newly registered or deleted in the memory table, a change flag of the reservation identifier is set in case the transmission speed of the connection changes. For example, as shown in FIG. 16, assume that the connection control section of six devices 2-1, 2-2, 2-3, 2-4, 2-5, 2-6 sets the connection and the device 2-1 creates the memory table in FIG. 17. The device 2-1 sends a transfer reservation to the device 2-2 in order to transfer the broadcast data to the device 2-5 (address E) and sends a transfer reservation to the device 2-3 in order to transfer the broadcast data to the device 2-4 (address D) and the device 2-6 (address F). In the fifth embodiment, if the transmission speed of the connection between the device 2-1 and the device 2-2 changes from 1 Mbps to 4 Mbps, the reservation identifier generation section 171 of the device 2-1 sets the change flag of the reservation identifier. In this case, the device 2-1 sends a transfer reservation to the device 2-2 in order to transfer the broadcast data to the device 2-4 (address D) and the device 2-5 (address E) and sends a transfer reservation to the device 2-3 in order to transfer the broadcast data to the device 2-6 (address F). As a result, in the device 2-1, transmission efficiency of the broadcast data to the device 2-4 (address D) goes up.

(Sixth embodiment)

Hereinafter, the sixth embodiment of the present invention is explained. The component of the infrared ray communication device of the sixth embodiment is the same as in the first embodiment. However, sending process of the data packet of flag 1 by the data communication processing section 10 is different from the first embodiment. In the sixth embodiment, the selection rule of connection in case of sending the data packet of flag 1 is changed as follows.

In case the destination address is the direct communicatable device:

A threshold of the transmission speed is set. Address and the transmission speed in line of the address of the memory table is confirmed. If the transmission speed is above a threshold, the connection identifier corresponding to the destination address in the line is selected. On the other hand, if the transmission speed is not above the threshold and the destination address represents the indirect communicatable device, next case that the destination address is the indirect communicatable device is used. If the transmission speed is not above the threshold and the destination address does not represent the indirect communicatable device, the connection identifier corresponding to the destination address in the line is selected in the same way as the case that the transmission speed is above a threshold.

In case the destination address is the indirect communicatable device:

Address entered in line of the address list is confirmed. If the same address is in plural lines of the address list, the qualities in the plural lines are compared. The connection identifier whose quality is highest. (For example, the highest transmission speed) is selected.

For example, a threshold of the transmission speed for connection selection rule is set as "1.5 Mbps". If the memory table shown in FIG. 11 is created, the data packet sending section 150 selects C13 in case of the destination address C. On the other hand, in case of the destination address D, this address D is included in both columns t41, t42. Therefore, two qualities of columns t21, t22 are compared, and the connection identifier C13 corresponding to higher transmission speed "2 Mbps" is selected. As a comparison result of quality of connection, for example, if a plurality of connections of the same quality (same transmission speed) are entered in the memory table, values of each connection identifier of the plurality of connections are compared and the connection identifier having the largest value is selected. After selecting the connection identifier, the data packet sending section 150 outputs the data packet of flag 1 with the selected connection identifier to the connection control section 20.

On the other hand, in the memory table shown in FIG. 11, the transmission speed corresponding to the connection identifier C12 is 1 Mbps below the threshold. In case of the destination address B, the data packet sending section 150 selects the connection identifier C13 because the device B is regarded as the indirect communicatable device through the device C.

For example, assume that the connection control section 20 is programed to inform one of "4 Mbps, 2 Mbps, 1 Mbps" to the data communication processing section 10, and the transmission speed "1 Mbps" is informed to the data communication processing section 10 even if status of communication path is bad. Packet loss often happens, and data transmission as the transmission speed "1 Mbps" is actually impossible. In the first embodiment, in case the destination address is the direct communicatable device, data transmission starts by selecting the connection identifier of connection set to the device. If the status of the connection is bad, it takes a long time to complete the data transmission. On the other hand, in the sixth embodiment, the threshold of the transmission speed is set for the connection selection rule. Therefore, passing of bad connection is avoided, and effective transmission of the data packet to the destination device is expected by relay transfer of the direct communicatable device.

(Seventh Embodiment)

Figure 22:
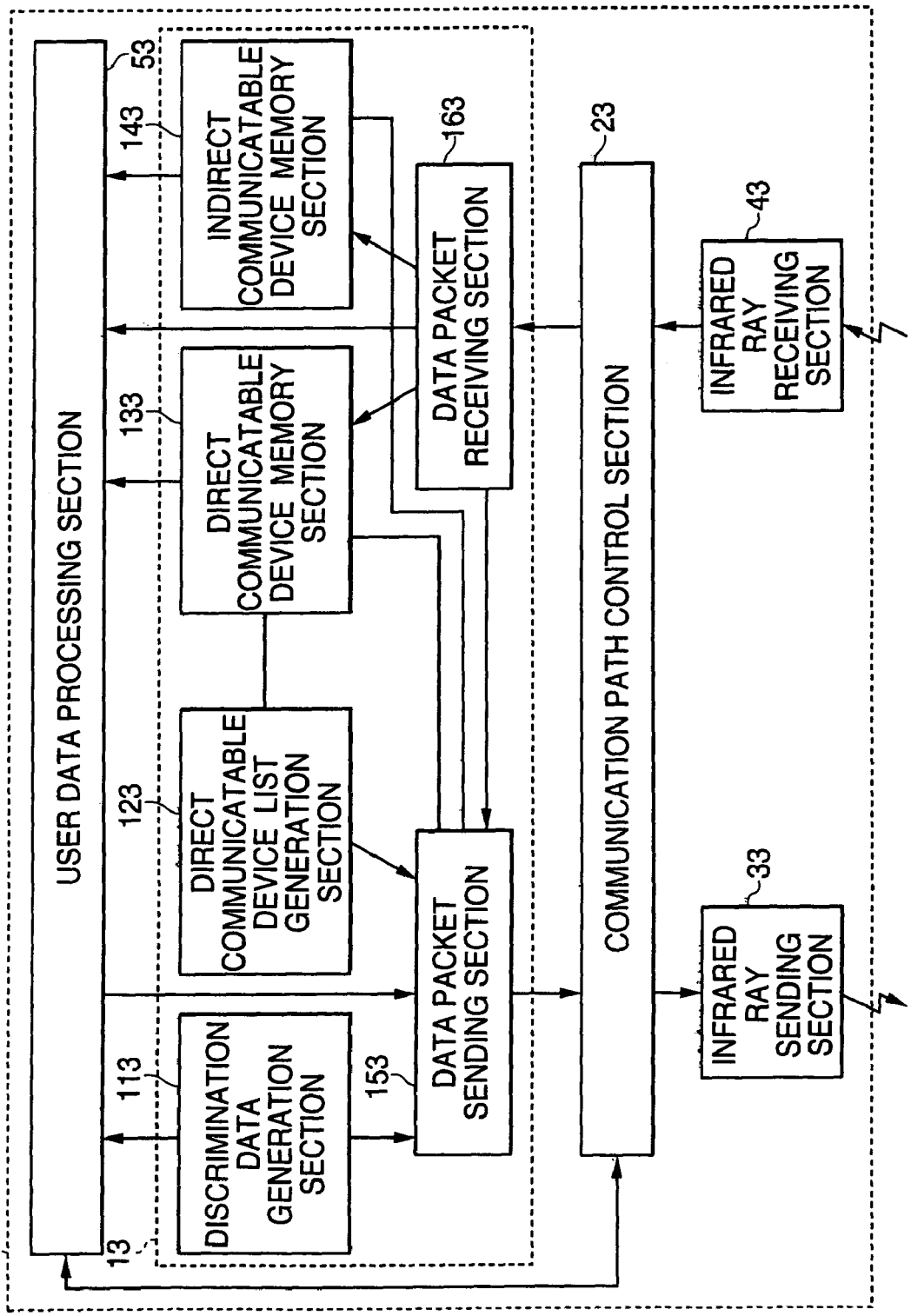
FIG. 22 is a block diagram of the data communication apparatus according to a third embodiment of the present invention.

Hereinafter, a seventh embodiment of the present invention will be explained by referring to FIGS. 22~31. FIG. 22 is a block diagram of an infrared ray communication device 3 according to the seventh embodiment. As shown in FIG. 22, the infrared ray communication device 3 includes a data communication processing section 13, a communication path control section 23, an infrared ray sending section 33, an infrared ray receiving section 43, and a user data processing section 53. The data communication processing section 13 includes a discrimination data generation section 113, a direct communicatable device list generation section 123, a direct communicatable device memory section 133, an indirect communicatable device memory section 143, a data packet sending section 153, and a data packet receiving section 163.

The user data processing section 53 is regarded as an application activated by sending/receiving data, or a communication protocol module. The communication path control section 23 prepares a media access control function to avoid a collision of the sending frame and a function to communicate to opposite device by connectionless type. In case of creating the sending frame, the communication path control section 23 enters device addresses of destination device and source device in packet input from the data communication processing section 13 or created by the communication path control section 23. In the seventh embodiment, an identifier used by the communication path control section 23 to discriminate the device is called the device address. Furthermore, in case of indicating all other devices as destination, device address for broadcast is used. By negotiating with other devices, the communication path control section 23 registers a device address of its device different from the device address of other communicatable device and the broadcast address.

This device address of the current device is stored in the communication path control section 23 and used as the device address of the source device in case of sending the frame. If the communication path control section 23 does not have a function to determine the device address of the current device by negotiation with other devices, the communication path control section 23 may store the device address different from other devices by the user's input. Furthermore, if the device address respectively different for each device is previously set, the device address set to the current device may be used as the device address of source address in case of sending the frame.

The infrared ray sending section 33 converts the frame as electrical signal to an infrared ray signal and radiates it into space. The infrared ray receiving section 43 receives the infrared ray signal sent by another device, converts it to a frame as electrical signal, and supplies the frame to the connection control section 23.

When the communication path control section 23 receives the frame from the infrared ray receiving section 43, the communication path control section 23 analyzes the frame, extracts a packet to be processed by the data communication processing section 13 from the frame if the device address of the current device or the broadcast address is indicated in the frame, and outputs the packet to the data communication processing section 13.

In the seventh embodiment, if the current device can directly receive a frame including the device address for broadcast sent by another device, the other device is called a direct communicatable device. For example, in FIG. 23, assume that four devices 81, 82, 83, 84 respectively include the communication path control section 23. The device 81 is positioned in two communicatable areas 820, 830. As for the device 81, the direct communicatable device is two devices 82, 83. The device 84 is not the direct communicatable device for the device 81. On the other hand, the device 82 is positioned in three communicatable areas 810, 830, 840. As for the device 82, the direct communicatable device is three devices 81, 83, 84.

In the infrared ray sending/receiving apparatus, IrDA (Infrared Data Association) defines the infrared ray sending section 33 and the infrared ray receiving section 43 as physical layer. Especially, in the seventh embodiment, the infrared ray sending/receiving apparatus of diffusion type called AIR (Advanced Infra-red) is used. The communication path control section 23 is protocol module defined by IrDA as "IrMAC" or "AIrMAC". While the frame is transmitted by the infrared ray sending section 33 and the infrared ray receiving section 43, in case of change of the transmission speed, the communication path control section 23 may inform the change of the transmission speed to the data communication processing section 13.

Hereinafter, a component of the data communication processing section 13 is explained. A packet exchanged between two devices by the data communication processing section 13 is called a data pack t. The data communication processing section 13 generates the data packet in case of sending data. The data packet includes an identifier to discriminate the kind of the data packet. In the first embodiment, this identifier is called a flag. As for the data packet including data input from the user data processing section 53, flag 0 (Flag 0) or flag 1 (Flag 1) is added. As for the data packet including data generated by the discrimination data generation section 113 or the direct communicatable device list generation section 123, flag 2 (Flag 2) and flag 3 (Flag 3) are respectively added.

The discrimination data generation section 113 generates or selects an address to discriminate the data communication processing section 13 of the current device and informs the address to the data packet sending section 153 and the data packet receiving section 163. In the seventh embodiment, the address to discriminate the data communication processing section 13 is called "address" different from "device address" used by the communication path control section 23. The discrimination data processing section 13 includes a protocol to generate the address different from other devices by negotiation with the other devices. The data communication processing section 13 may generate the address by using the device address of the current device set by the communication path control section 23. The discrimination data generation section 113 generates a data packet including the address of the own device and outputs the data packet to the data packet sending section 153. The flag 2 is added to this data packet. Furthermore, the discrimination data generation section 113 informs the address of the current device to the user data processing section 53.

When the data packet receiving section 163 receives a data packet of flag 2 sent by another device, the data packet receiving section 163 supplies the data packet of flag 2 to the direct communicatable device memory section 133. The direct communicatable device memory section 133 extracts the address to discriminate the data communication processing section of a direct communicatable device from the data packet and stores the address and the device address as a pair. Furthermore, the address of the direct communicatable device is informed to the user information processing section 53.

After the addresses of all direct communicatable devices are obtained from the received data packets, the direct communicatable device list generation section 123 generates a list including the address of all direct communicatable devices stored in the direct communicatable device memory section 133. Hereinafter, the list generated by the direct communicatable device list generation section 123 is called an address list. After generating the address list the direct communicatable device list generation section 123 generates a data packet including the address list, and outputs it to the data packet sending section 153. The flag 3 is added to the data packet generated by the direct communicatable device list generation section 123

When the data packer receiving section 163 receives a data packet of flag 3 sent by another-device, the data packet receiving section 163 supplies it to the indirect communicatable device memory section 143. The indirect communicatable device memory section 143 extracts the address list generated by the direct communicatable device from the data packet and stores the address list and the device address as a pair. Furthermore, the address except for the own device and the direct communicatable device is extracted from the address list and is informed to the user information processing section 53. Hereinafter, the device of the address in the address list except for the own device and the direct communicatable device is called an indirect communicatable device.

Furthermore, the data packet sending section 153 may send the data packet including the address generated or selected by the discrimination data generation section 113 and the data packet including the address list generated by the direct communicatable device list generation section 123 as one unit. In this case, instead of adding flags 2 and 3 by the discrimination data generation section 113 and the direct communicatable device list generation section 123, the data packet sending section 153 adds another flag representing inclusion of both the address and the address list.

On the other hand, if the discrimination data generation section 113 uses the device address or the current device set by the communication path control section 23 as the address to discriminate the data communication processing section 13 of the current device, the device address of the current device is already added to all frames sent by the communication path control section 23 as source address. Therefore the discrimination data generation section 113 can inform the address to discriminate the data communication processing section 13 of the own device to the destination device without generating the data packet of flag 2.

In case of sending data, the user data processing section 53 selects the address of a destination device stored in the direct communicatable device memory section 133 or the indirect communicatable device memory section 143 and outputs the data to the data packet sending section 153.

In case of outputting the data packet including the address of the current device and the address list to the communication path control section 23, the data packet sending section 153 instructs the communication path control section 23 to add a device address for broadcast to the data packet. The data packet sending section 153 may periodically output the data packet to the communication path control section 23 to periodically send it to another device.

When the data packet sending section 153 receives the data and the address of destination device from the user data processing section 53, the data packet sending section 153 generates a data packet of flag 1 including the data and the address of destination device. Next, the data packet sending section 153 refers to a relation between the address and the device address stored in the direct communicatable device memory section 133 and the indirect communicatable device memory section 143, retrieves one device address corresponding to the address of the destination address, and outputs the data packet with the device address to the connection control section 23. A method for selecting the device address is the same as the sending process of data packet of flag 1 of the data communication processing section 13 explained afterwards.

When the data packet receiving section 163 receives data packet sent by other device through the connection control section 23, the data packet receiving section 163 confirms a flag value in the data packet. In case of flag 1, the data packet is output to the user data processing section 53. In case of flag 2, the data packet is output to the direct communicatable device memory 133. In case of flag 3, the data packet is output to the indirect communicatable device memory 143. However, in case of flag 1, the address in the data packet is analyzed. If the address coincides with an address of the current device, the data packet is output to the user data processing section 53. In case of incoincidence, the data packet is processed by receiving process of data packet of flag 1 of the data communication processing section 13 explained afterwards. Furthermore, when the data packet receiving section 163 outputs the data packet of flag 2 or flag 3 to the direct communicatable device memory section 133 or the indirect communicatable device memory 143, the device address of the source device from which the data packet is transmitted is informed together with the data packet.

FIG. 24 shows a concrete example of structure of frame including the data packet. The data packet consists of a flag, a destination address, a source address, and data. The frame consists of a destination device address, a source device address, and the data packet. In the frame or the data packet, error correction data may be included.

FIG. 25 shows a memory table to store the device address, quality, and the address and the address list of the direct communicatable device. In FIG. 25, the quality represents communicatable or non-communicatable for the direct communicatable device at the current time. The memory table is commonly used by the data packet sending section 153, the data packet receiving section 163, the direct communicatable device memory section 133, and the indirect communicatable device memory section 143. However, each section may respectively manage each memory table of different form.

On the other hand, if the discrimination data generation section 113 uses the device address of its device set by the communication path control section 23 as address to discriminate the data communication processing section 13 of its device, the memory table shown in FIG. 26 is used.

Figures 28, 29:
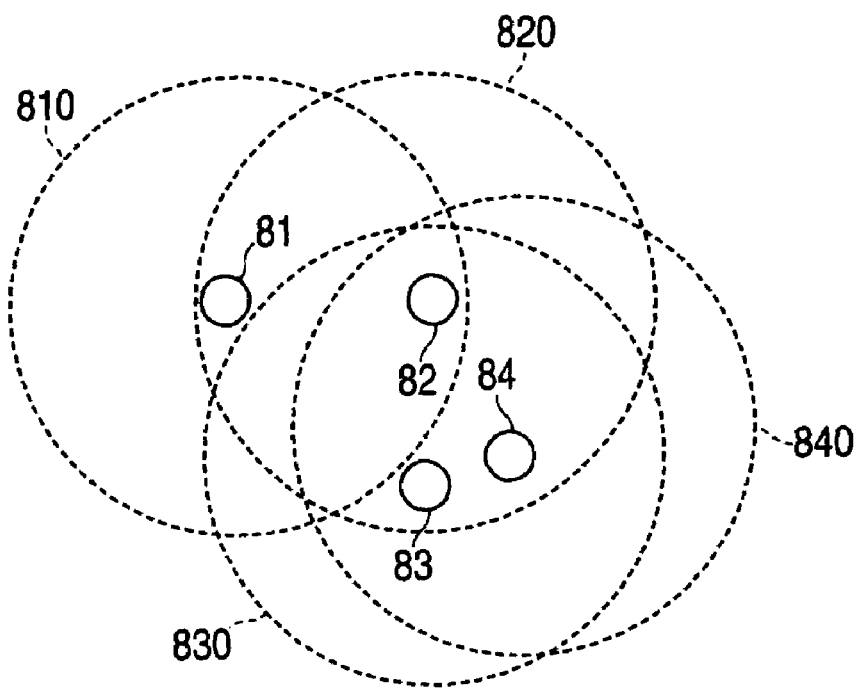
FIG. 28 is a schematic diagram of a second example of the communicatable area of four devices.
FIG. 29 is a schematic diagram of a second concrete example of data stored in the memory table according to the third embodiment.
Figures 30, 31:
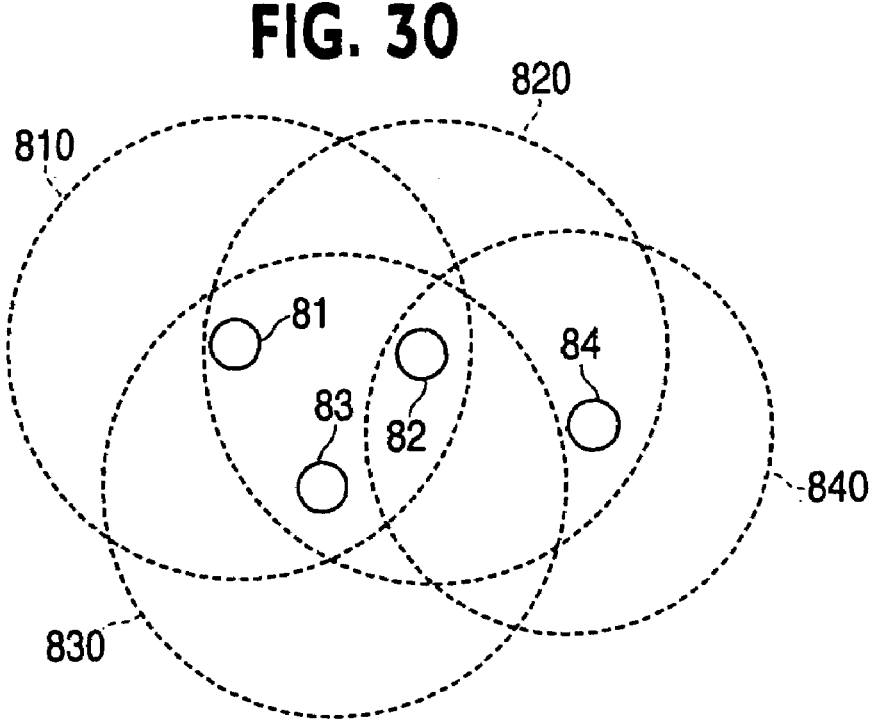
FIG. 30 is a schematic diagram of a third example of the communicatable area of four devices.
FIG. 31 is a schematic diagram of a third concrete example of data stored in the memory table according to the third embodiment.

Hereinafter, a concrete example of a method for updating the memory table is explained. As shown in FIG. 23, assume that four devices 81, 82, 83, 84 include components of the communication device 3 of FIG. 22, the address to discriminate the data communication processing section 13 of each device is A81, A82, A83, A84, the device address of each device is DA81, DA82, DA83, DA84, the communicatable area of each device is 810, 820, 830, 840, and each device periodically transmits the data packet of flag 2, and flag 3. In FIG. 23, after each device receives the data packet from the other devices, the memory table of the device 81 is updated as shown in FIG. 27. Each device decides to communicate to another device by receiving the data packet of flag 2 sent by the other device. If the data packet of flag 2 is not received for T period, the other device is decided to cut from the own device. For example, as shown in FIG. 28, assume that the device 81 can not receive the data packet of flag 2 sent by the device 83 for T period because of location change of the device 83. In this case, the memory table of the device 81 is updated as shown in FIG. 29. On the other hand, as shown in FIG. 30, assume that the device 83 can not receive the data packet of flag 2 sent by the device 84 for T period because of location change of the device 84. In this case, the address list sent by the device 83 includes A81 and A82 only. As a result, the memory table of the device 81 is updated as shown in FIG. 31.

Hereinafter, a function of the direct communicatable device memory section 133 and the indirect communicatable device memory section 143 to inform the address of the direct communicatable device and the indirect communicatable device to the user data processing section 53 is explained.

The direct communicatable device memory section 133 has a function to inform the address of the direct communicatable device to the user data processing section 53. For example, if the memory table as shown in FIG. 25 is managed, the direct communicatable device memory section 133 confirms a line of the address and informs addresses entered in the address to the user data processing section 53. In short, in case of the content of the memory table shown in a FIG. 27, addresses A82, A83 of the direct communicatable device are informed to the user data processing section 53. An information of address from the direct communicatable device memory section 133 to the user data processing section 53 is executed in response to a request from the user data processing section 53. However, the information may be executed in case of change of content of the memory table, or may be periodically executed.

The indirect communicatable device memory section 143 has a function to inform the addresses of the indirect communicatable device to the user data processing section 53. For example, if the memory table as shown in FIG. 25 is managed, the indirect communicatable device memory section 143 confirms a line of the address list and informs addresses entered in the address list except for the addresses of the current device and of the direct communicatable device to the user data processing section 53. In short, in case of the content of the memory table shown in FIG. 27, "A84" in the address list is not included in a line of the address (direct communicatable device) and "A84" as address of the indirect communicatable device is informed to the user data processing section 53. An information of address from the indirect communicatable device memory section 143 to the user data processing section 53 is executed in response to a request from the user data processing section 53. However, the information may be executed in case of change of content of the memory table, or may be periodically executed.

Next, a process for the data communication processing section 13 to send the data packet or flag 1 is explained. The user data processing section 53 outputs data with address of destination device to the data packet sending section 153. The address of destination device is the address to discriminate the data communication processing section 13 of the destination device or the broadcast address for broadcast.

When the data packet sending section 153 receives the data with destination address from the user data processing section 53, the data packet sending section 153 generates the data packet of flag 1. Furthermore, the data packet sending section 153 confirms the destination address, and selects the device address to send the data packet to the destination device. The data packet sending section 153 manages the memory table shown in FIG. 25. The data packet sending section 153 selects the device address by following rule.

In case the destination address is the direct communicatable device:
Address entered in a line of the address is confirmed. The device address corresponding to the destination address in the line is selected.

In case the destination address is the indirect communicatable device:
Address entered in a line of the address list is confirmed. If the same address is in plural lines of the address list, the qualities in the plural lines are compared. The device address whose quality is not "DISCONNECTION" is selected.

In case the destination address is the broadcast address:
This address is regarded as the device address for broadcast.

For example, if the memory table shown in FIG. 27 is created by the device 81, the data packet sending section 153 selects DA82 in case of the destination address A82, and selects DA83 in the case of the destination address A83. On the other hand, in case of the destination address A84, the quality of both DA82, DA83 is respectively "connection". Therefore, both device addresses are selected. After selecting the device address, the data packet sending section 153 outputs the data packet of flag 1 with the selected device address to the connection control section 23. If a plurality of device addresses are selected, the data packet sending section 153 indicates the device address in order and outputs the data packet of flag 1 to the communication path control section 23 to send the data packet to all devices of selected device addresses. In the seventh embodiment, in case of selecting a plurality of device addresses, the data packet is sent to all devices of selected device addresses. However, in case of selecting a plurality of device addresses, one device address may be selected according to algorithm to determine arbitrary one device address from the plurality of device addresses. For example, one device address of largest value or smallest value may be selected.

Next, a process for the data communication processing section 13 to receive the data packet of flag 1 is explained. When the data packet receiving section 163 receives the data packet of flag 1, the data packet receiving section 163 confirms the destination address in the data packet. If the destination address coincides with the address of the current device or the broadcast address, data and address of source device in the data packet are informed to the user data processing section 53. On the other hand, if the destination address does not coincide with the address of the current device, the data packet receiving section 163 confirms the memory table. If the destination address is entered in a line of the address (direct communicatable destination address) of the memory table, the data packet receiving section 163 selects the device address corresponding to the destination address, changes the flag of received data packet from "1" to "0", and outputs the data packet of flag 0 to the communication path control section 23. If the destination address is the broadcast address, the following broadcast transfer process is executed.

First example of the broadcast transfer process is explained. If the data packet of flag 1 of which the destination address is the broadcast address is received, the data packet receiving section 163 refers the memory table in order to confirm the address of indirect communicatable device in the address list corresponding to the device address or the address of source device. If the address of the direct communicatable device except for the confirmed address of indirect communicatable device is found in the memory table, the device address corresponding to the found address is retrieved. The data packet receiving section 163 indicates the device address, changes the flag of the data packet from "1" to "0", and outputs the data packet of flag 0 to the communication path control section 23 through the data packet sending section 153. If a plurality of addresses of the direct communicatable devices except for the confirmed address of indirect communicatable device is found in the memory table, the data packet receiving section 163 indicates the corresponding device address in order, and repeatedly outputs the data packet of flag "0" to the communication path control section 23.

Next, a second example of the broadcast transfer process is explained. In the second example, if a plurality of addresses of the direct communicatable device except for the confirmed address of indirect communicatable device are found and a number of the plurality of addresses is above "N", the data packet receiving section 163 indicates the broadcast address and outputs the data packet of flag 0 to the communication path control section 23 only one time without indicating the device address in order and repeat output of the data packet of flag 0.

Next, a third example of the broadcast transfer process is explained. If the data packet of flag 1 of which the destination-address is the broadcast address is received, the data packet receiving section 163 refers to the memory table in order to confirm the address of indirect communicatable device in the address list (called "address list column 1") corresponding to the device address or the address of the source device. If address of the direct communicatable device is not included in the address list column 1 is found in the memory table, this found address is called "address 1". Addresses in address list (called "address list column 2")

corresponding to address 1 is confirmed in the memory table. If the address of the source device is not included in address list column 2, the device address corresponding to address 1 is retrieved from the memory table. The data packet receiving section 163 indicates the device address changes the flag of the data packet from "1" to "0", and outputs the data packet of flag 0 to the communication path control section 23 through the data packet sending section 153. If a plurality of addresses of the direct communicatable devices not included in the address list column 1 are found in the memory table, the address list column 2 corresponding to each of the plurality of addresses is confirmed in the memory table. Then, the address of the source device is decided to be included in the address list column 2. If a plurality of address list columns 2 do not include the address of the source device, the data packet receiving section 163 indicates the device address corresponding to each of the plurality of address list column 2 in order as above-mentioned address 1 and repeatedly outputs the data packet of flag "0" to the communication path control section 23.

Next, a fourth example of the broadcast transfer process is explained. In the fourth example, if a plurality of addresses of the direct communicatable device not included in the address list column 1 are found in the memory table, the address list column 2 corresponding to each of the plurality of addresses is confirmed in the memory table. Then, the address of the source device is decided to be included in the address list column 2. If a plurality of address list columns 2 do not include the address of the source device and a number of the plurality of address list columns 2 is above "N", the data packet receiving section 163 indicates the broadcast address and outputs the data packet of flag 0 to the communication path control section 23 only one time without indicating the device address in order and repeat output of the data packet of flag 0.

In above-mentioned seven embodiments, the communication device including the infrared ray sending section and infrared ray receiving section are explained as examples. However, the present invention is not limited to the infrared ray communication device. For example, a radio transmitter and a radio receiver of directivity may be included in the communication device. In this case, a millimeter wave may be used as the carrier wave.

A memory can be used to store instructions for performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A data communication apparatus including a sending unit and a receiving unit to communicate a radio signal light as a carrier wave to a plurality of similar data communication devices, comprising:
  a discrimination data generation unit configured to generate discrimination data of its device through said sending unit;
  a direct communicatable device memory configured, when said receiving unit receives discrimination data sent from another device, to store the discrimination data of the other device as a direct communicatable device;
  a direct communicatable device list generation unit configured to generate a direct communicatable device list including the discrimination data stored in said direct communicatable device memory, and to send the direct communicatable device list with the discrimination data of its device through said sending unit;
  an indirect communicatable device memory configured, when said receiving unit receives a direct communicatable device list sent from the other device, to store the direct communicatable device list sent from the other device as an indirect communicatable device list in relation to the discrimination data of the other device; and
  a user data processing unit configured to select the discrimination data as a destination address from the discrimination data stored in said direct communicatable device memory and said indirect communicatable device memory, and to send data with the destination address through said sending unit.

2. The data communication apparatus according to claim 1, wherein said sending unit respectively attaches a discrimination flag to the discrimination data of its device, the direct communicatable device list, and the data with the destination address in case of sending as a data packet.

3. The data communication apparatus according to claim 1, wherein said user data processing unit outputs the discrimination data stored in said direct communicatable device memory and the discrimination data stored in said indirect communicatable device memory.

4. The data communication apparatus according to claim 1, further comprising a connection control unit configured to set a connection path to each direct communicatable device, and to assign a connection identifier to discriminate the connection path.

5. The data communication apparatus according to claim 4, wherein said direct communicatable device memory and said indirect communicatable device memory correspondingly store the connection identifier, a quality of the connection, the discrimination data of the direct communicatable device, and the discrimination data of the indirect communicatable device as the direct communicatable device list sent from the other device, in a common table.

6. The data communication apparatus according to claim 5, wherein said sending unit retrieves the connection identifier corresponding to the destination address from the common table if the destination address coincides with the discrimination data of the direct communicatable device or the indirect communicatable device in the common table, and sends the data with the destination address through the connection path corresponding to the connection identifier.

7. The data communication apparatus according to claim 6, wherein said sending unit selects the connection identifier whose quality is higher from a plurality of connection identifiers corresponding to the destination address in the common table if the destination address coincides with the discrimination data of the indirect communicatable device corresponding to the plurality of connection identifiers.

8. The data communication apparatus according to claim 7, wherein said sending unit compares a transmission speed of the quality for each of the plurality of connection identifiers, and selects the connection identifier whose transmission speed is highest.

9. The data communication apparatus according to claim 8, wherein said sending unit compares a discrimination number of the direct communicatable device corresponding to each of the plurality of connection identifiers if the transmission speeds of the plurality of connection identifiers are equal, and selects the connection identifier corresponding to the largest discrimination number or the smallest discrimination number.

10. The data communication apparatus according to claim 7, further comprising a reservation identifier generation unit configured to generate a reservation identifier for the direct communicatable device to automatically transfer the data to the indirect communicatable device stored in said indirect communicatable device memory, and to send the reservation identifier with the discrimination data of the indirect communicatable device as the destination address to the direct communicatable device through said sending unit; and further comprising a reservation identifier memory configured, when said receiving unit receives the reservation identifier with the destination address sent from the other device, to store the reservation identifier with the discrimination data of the direct communicatable device if the destination address coincides with the discrimination data stored in said direct communicatable device memory.

11. The data communication apparatus according to claim 6, wherein said sending unit stores the selected connection identifier with the discrimination data of the indirect communicatable device as the destination address, and sends the following data of same destination address through the connection path corresponding to the stored connection identifier.

12. The data communication apparatus according to claim 11, wherein said sending unit clears the stored connection identifier with the destination address at a predetermined interval, and selects the connection identifier corresponding to the discrimination data from the common table in order to newly store the connection identifier with the discrimination data.

13. The data communication apparatus according to claim 9, wherein said connection control unit monitors the status of each connection path, and changes the connection identifier in the common table in case of detecting a change of status of the connection path; and wherein said sending unit selects the connection identifier corresponding to the discrimination data from the common table in order to newly store the connection identifier with the discrimination data in case of change of the connection identifier in the common table.

14. The data communication apparatus according to claim 13, wherein said reservation identifier generation unit newly generates the reservation identifier corresponding to the indirect communicatable device if said connection control unit detects a change of status of the connection path, and newly sends the reservation identifier with the discrimination data of the indirect communicatable device as the destination address to the direct communicatable device through said sending unit.

15. The data communication apparatus according to claim 5, wherein said sending unit, if the quality of the connection path to the direct communicatable device is below a threshold, selects another connection path to another direct communicatable device in order to transfer data from the other direct communicatable device to the direct communicatable device if the quality of the other connection path is above the threshold, and sends the data through the other connection path.

16. The data communication apparatus according to claim 1, further comprising a communication path control unit configured to assign a device address to discriminate its device, the device address being different from the discrimination data of its device.

17. The data communication apparatus according to claim 16, wherein said direct communicatable device memory and said indirect communicatable device memory correspondingly store the device address of the direct communicatable device, a quality of connection, the discrimination data of the direct communicatable device, and the discrimination data of the indirect communicatable device as the direct communicatable device list sent from the other device, in a common table.

18. The data communication apparatus according to claim 17, wherein said sending unit sends the data packet including the device address of its device as a source address, and a broadcast address of all other devices as a destination address.

19. A method for communicating data among a plurality of devices, each device including a sending unit and a receiving unit to communicate a radio signal light as a carrier wave for other devices, comprising:

sending discrimination data of a first device;

receiving the discrimination data sent from another device;

storing the discrimination data of the other device as a direct communicatable device for the first device;

generating a direct communicatable device list including the discrimination data stored;

sending the direct communicatable device list with the discrimination data of the first device;

receiving a direct communicatable device list sent from the other device;

storing the direct communicatable device list sent from the other device as an indirect communicatable device for the first device in relation to the discrimination data of the other device;

selecting the discrimination data as a destination address from the discrimination data of the direct communicatable device and the indirect communicatable device; and sending data with the destination address.

20. A computer program product, comprising:

a computer readable program code embodied in said product for causing a computer to communicate data among a plurality of devices, each device including a sending unit and a receiving unit to communicate a radio signal light as a carrier wave for other devices, comprising:

a first program code to send discrimination data of a first device;

a second program code to receive the discrimination data sent from another device;

a third program code to store the discrimination data of the other device as a direct communicatable device for the first device;

a fourth program code to generate a direct communicatable device list including the discrimination data stored;

a fifth program code to send the direct communicatable device list with the discrimination data of the first device;

a sixth program code to receive a direct communicatable device list sent from the other device;

a seventh program code to store the direct communicatable device list sent from the other device as an indirect communicatable device for the first device in relation to the discrimination data of the other device;

an eighth program code to select the discrimination data as a destination address from the discrimination data of the direct communicatable device and the indirect communicatable device; and a ninth program code to send data with the destination address.

* * * * *